United States Patent
Shiota et al.

(10) Patent No.: US 12,235,561 B2
(45) Date of Patent: Feb. 25, 2025

(54) LIGHT RAY DIRECTION CONTROL ELEMENT AND DISPLAY DEVICE

(71) Applicant: TIANMA JAPAN, LTD., Kanagawa (JP)

(72) Inventors: Kunihiro Shiota, Kanagawa (JP); Ken Sumiyoshi, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 534 days.

(21) Appl. No.: 17/582,632

(22) Filed: Jan. 24, 2022

(65) Prior Publication Data
US 2022/0236617 A1    Jul. 28, 2022

(30) Foreign Application Priority Data
Jan. 28, 2021 (JP) ................................. 2021-011600

(51) Int. Cl.
*G02F 1/167* (2019.01)
*G02F 1/13357* (2006.01)
(Continued)

(52) U.S. Cl.
CPC ........ *G02F 1/167* (2013.01); *G02F 1/133606* (2013.01); *G02F 1/16755* (2019.01);
(Continued)

(58) Field of Classification Search
CPC ............... G02F 1/167; G02F 1/133606; G02F 1/16755; G02F 1/1676; G02F 1/29; G02F 2001/1678; G02F 1/1323; G02F 1/1335
See application file for complete search history.

(56) References Cited

U.S. PATENT DOCUMENTS 4,807,978 A * 2/1989 Grinberg ................. G02B 5/203
345/589
5,528,319 A * 6/1996 Austin ..................... H04N 5/65
348/835
(Continued)

FOREIGN PATENT DOCUMENTS

JP           4899503 B2    3/2021
KR   10-2020-0028078 A    3/2020

OTHER PUBLICATIONS

Communication dated Jul. 2, 2024, issued in Japanese Application No. 2021-011600.

*Primary Examiner* — Wyatt A Stoffa
*Assistant Examiner* — John Curtis Sipes
(74) *Attorney, Agent, or Firm* — Sughrue Mion, PLLC

(57) ABSTRACT

A light ray direction control element includes a first light transmitting substrate, a second light transmitting substrate facing the first light transmitting substrate, a first light transmitting region provided on a first main surface of the first light transmitting substrate, a second light transmitting region provided on a first main surface of the second light transmitting substrate, first light absorbing regions positioned among the first light transmitting region, and second light absorbing regions positioned among the second light transmitting region. The light ray direction control element further includes a light transmitting dispersion medium enclosed in the first light absorbing regions and the second light absorbing regions, and charged electrophoretic particles dispersed in the light transmitting dispersion medium. When viewing a cross-section perpendicular to the first main surface of the first light transmitting substrate, the shape or the angle of inclination, with respect to the first main surface (Continued)

of the first light transmitting substrate, of the first light transmitting region and the second light transmitting region differs.

17 Claims, 23 Drawing Sheets

(51) Int. Cl.
*G02F 1/16755* (2019.01)
*G02F 1/1676* (2019.01)
*G02F 1/29* (2006.01)
*G02F 1/1675* (2019.01)

(52) U.S. Cl.
CPC .............. *G02F 1/1676* (2019.01); *G02F 1/29* (2013.01); *G02F 2001/1678* (2013.01)

(56) References Cited

U.S. PATENT DOCUMENTS

| | | | |
|---|---|---|---|
| 2004/0169912 A1* | 9/2004 | Liang | G02F 1/167 |
| | | | 359/296 |
| 2006/0238664 A1* | 10/2006 | Uehara | G02F 1/133606 |
| | | | 349/1 |
| 2018/0231703 A1* | 8/2018 | Ueno | G02B 5/3025 |
| 2020/0050075 A1 | 2/2020 | Lin et al. | |
| 2021/0173240 A1* | 6/2021 | Li | G02F 1/133504 |
| 2021/0208326 A1* | 7/2021 | Zhao | G02F 1/1335 |
| 2021/0373403 A1 | 12/2021 | Kim et al. | |
| 2022/0291564 A1* | 9/2022 | Han | G02F 1/167 |

\* cited by examiner

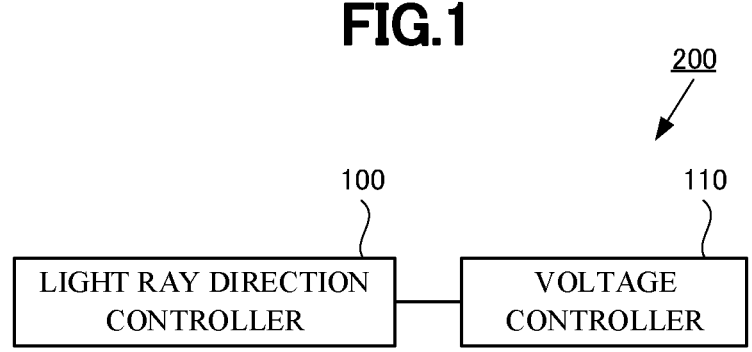
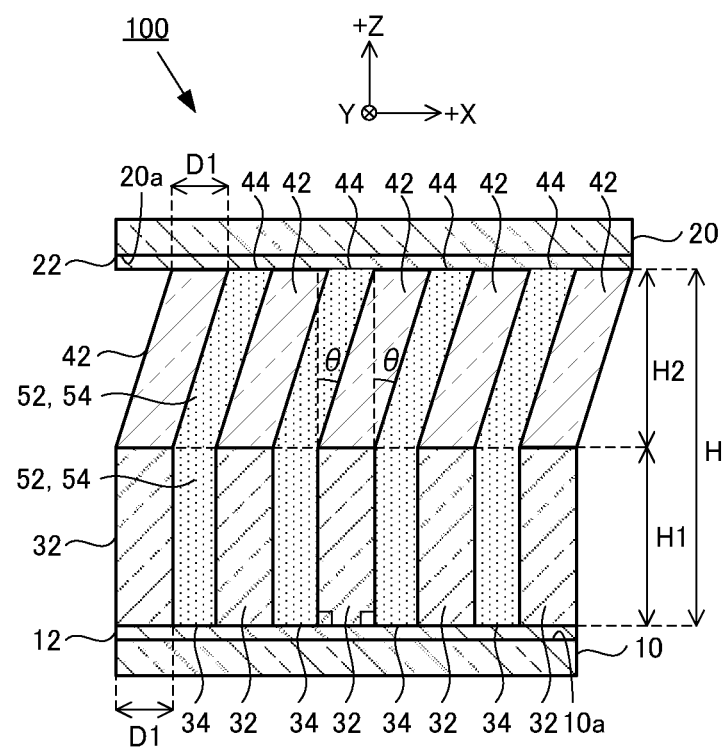

PLANE PARALLEL TO XZ PLANE

PLANE PARALLEL TO XZ PLANE

LIGHT RAY DIRECTION CONTROL ELEMENT AND DISPLAY DEVICE

CROSS-REFERENCE TO RELATED APPLICATION

This application claims the benefit of Japanese Patent Application No. 2021-11600, filed on Jan. 28, 2021, the entire disclosure of which is incorporated by reference herein.

FIELD

The present disclosure relates generally to a light ray direction control element and a display device.

BACKGROUND

Light ray direction control elements that control the direction of transmitted light are known. For example, Japanese Patent No. 4899503 describes an optical element that is arranged on a front face side of a liquid crystal display element and that controls the direction of light rays that are emitted from a surface emitting light source and that pass through the liquid crystal display element. The optical element of Japanese Patent No. 4899503 includes a pair of transparent substrates that include transparent electrode films, and a composite material layer disposed between the pair of transparent substrates. The composite material layer is formed from a UV curable polymer material and a liquid crystal material dispersed in the UV curable polymer material. The composite material layer includes first regions that have optical transparency, and second regions adjacent to the first regions. In the first regions, the polymer material is cured in a state in which the liquid crystal particles are aligned with the direction that the transparent substrates face. In the second regions, the alignment state of the liquid crystal material is electrically switched between a light transmitting alignment state and a light-scattering alignment state.

In Japanese Patent No. 4899503, the viewing angle mode of the optical element is selectively switched by switching the alignment state of the liquid crystal material. Specifically, by setting the liquid crystal material to the light transmitting alignment state, the viewing angle mode is switched to a first viewing angle mode in which the light from the liquid crystal element is emitted at a first angle. Additionally, by setting the liquid crystal material to the light-scattering alignment state, the viewing angle mode is switched to a second viewing angle mode in which the light from the liquid crystal element is emitted at a second angle smaller than the first angle. The optical element of Japanese Patent No. 4899503 can emit light in two types of angle distributions. However, depending on the usage situation, there is a need for an optical element that can emit light in multiple types of angle distributions.

SUMMARY

A light ray direction control element according to a first aspect includes:
a first light transmitting substrate;
a second light transmitting substrate facing the first light transmitting substrate;
a first light transmitting region that is provided on a first main surface of the first light transmitting substrate and that extends from the first light transmitting substrate toward the second light transmitting substrate;
a second light transmitting region that is provided on a first main surface of the second light transmitting substrate that faces the first main surface of the first light transmitting substrate, that extends from the second light transmitting substrate toward the first light transmitting substrate, and that is continuous with the first light transmitting region;
a plurality of first light absorbing regions that is positioned among the first light transmitting region and that extends from the first light transmitting substrate toward the second light transmitting substrate;
a plurality of second light absorbing regions that is positioned among the second light transmitting region, that extends from the second light transmitting substrate toward the first light transmitting substrate, and that is continuous with the first light absorbing regions;
a light transmitting dispersion medium that is enclosed in the first light absorbing regions and the second light absorbing regions; and
charged electrophoretic particles that are dispersed in the light transmitting dispersion medium and that have a dispersion state that changes according to voltage that is applied, wherein
when viewing a cross-section perpendicular to the first main surface of the first light transmitting substrate and the first main surface of the second light transmitting substrate, a shape or an angle of inclination, with respect to the first main surface of the first light transmitting substrate, of the first light transmitting region and the second light transmitting region differs.

A display device according to a second aspect includes:
the light ray direction control element described above; and
a display panel, wherein
the light ray direction control element is disposed on a display surface of the display panel.

A display device according to a third aspect includes:
the light ray direction control element described above;
a transmissive liquid crystal display panel; and
a back light that is disposed on a side of the transmissive liquid crystal display panel opposite a display surface, and that supplies light to the transmissive liquid crystal display panel, wherein
the light ray direction control element is disposed between the transmissive liquid crystal display panel and the back light.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 1 is a schematic drawing illustrating a light ray direction control element according to Embodiment 1;

FIG. 2 is a cross-sectional view illustrating a light ray direction controller according to Embodiment 1;

DETAILED DESCRIPTION

Figure 3:
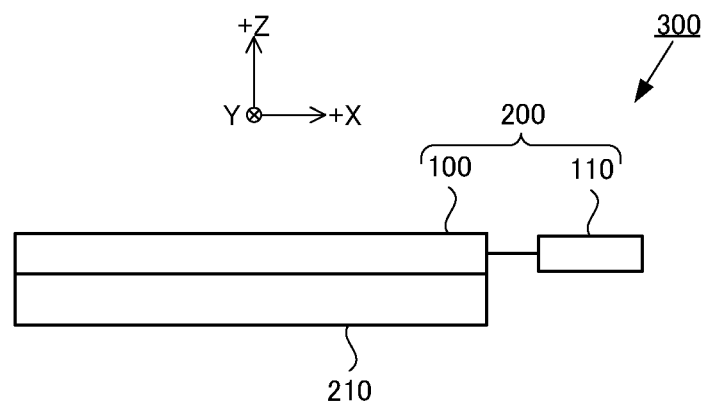
FIG. 3 is a schematic drawing illustrating a display device according to Embodiment 1.

Hereinafter, a light ray direction control element and a display device according to embodiments are described while referencing the drawings.

Embodiment 1

A light ray direction control element 200 according to the present embodiment is described while referencing FIGS. 1 to 11. As illustrated in FIG. 1, the light ray direction control element 200 includes a light ray direction controller 100 and a voltage controller 110. The light ray direction controller 100 controls the angle distribution of transmitting light (that is, the emitted light of the light ray direction controller 100). As illustrated in FIG. 2, the light ray direction controller 100 includes a first light transmitting substrate 10, a second light transmitting substrate 20, first light transmitting regions 32, first light absorbing regions 34, second light transmitting regions 42, and second light absorbing regions 44. A light transmitting dispersion medium 52 and electrophoretic particles 54 are enclosed in the first light absorbing regions 34 and the second light absorbing regions 44. The voltage controller 110 controls voltage applied to the electrophoretic particles 54. Note that, in the present description, to facilitate comprehension, for the light ray direction controller 100 of FIG. 1, the right direction (the right direction on paper) is referred to as the "+X direction", the up direction (the up direction on paper) is referred to as the "+Z direction", and the direction perpendicular to the +X direction and the +Z direction (the depth direction on paper) is referred to as the "+Y direction." Additionally, the +X direction, the −X direction, the +Y direction, and the −Y direction may also be referred to respectively as the left direction, the right direction, the up direction, and the down direction.

As illustrated in FIG. 3, the light ray direction control element 200 and a display panel 210 constitute a display device 300. The display device 300 is mounted in a smartphone, a laptop computer, a vehicle, an information display, or the like. The display panel 210 displays text, images, and the like. The display panel 210 is implemented as a liquid crystal display panel, an organic electro-luminescence (EL) display panel, or the like.

The light ray direction control element 200 controls the angle distribution of light that exits from the display panel 210 and transmits through the light ray direction controller 100. The light ray direction controller 100 of the light ray direction control element 200 is disposed on a display surface of the display panel 210.

Returning to FIG. 2, the first light transmitting substrate 10 of the light ray direction controller 100 transmits visible light. In one example, the first light transmitting substrate 10 is implemented as a flat glass substrate. The first light transmitting substrate 10 includes a first light transmitting electrode 12 on a first main surface 10a. In the present embodiment, the first light transmitting electrode 12 is formed on the entire first main surface 10a. The first light transmitting electrode 12 is formed from indium tin oxide (ITO) Additionally, a non-illustrated insulation layer is provided on the first light transmitting electrode 12. In one example, the insulation layer is formed from silicon oxide ($SiO_2$).

As with the first light transmitting substrate 10, the second light transmitting substrate 20 of the light ray direction controller 100 transmits visible light. In one example, the second light transmitting substrate 20 is implemented as a flat glass substrate. The second light transmitting substrate 20 includes a second light transmitting electrode 22 on a first main surface 20a. The second light transmitting electrode 22 is formed on the entire first main surface 20a. The second light transmitting electrode 22 is formed from ITO. Additionally, an insulation layer is provided on the second light transmitting electrode 22.

The second light transmitting substrate 20 faces the first light transmitting substrate 10. In the present embodiment, the first main surface 10a of the first light transmitting substrate 10 and the first main surface 20a of the second light transmitting substrate 20 face each other.

Figure 4:
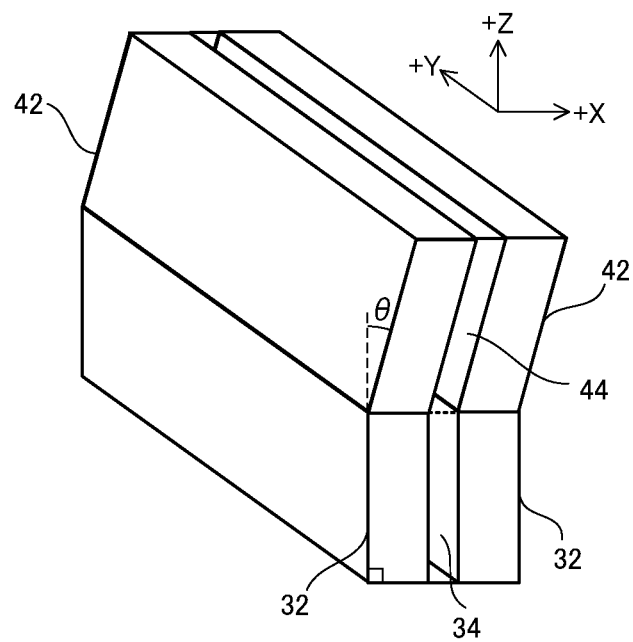
FIG. 4 is a perspective view illustrating first light transmitting regions, first light absorbing regions, second light transmitting regions, and second light absorbing regions according to Embodiment 1.

The first light transmitting regions 32 of the light ray direction controller 100 are regions that transmit visible light. In one example, the first light transmitting regions 32 are light transmitting layers formed from light transmitting resin. The first light transmitting regions 32 are provided on the first main surface 10a of the first light transmitting substrate 10. In the present embodiment, a plurality of first light transmitting regions 32 is arranged in the X direction at a predetermined spacing. The first light transmitting regions 32 have a rectangular parallelepiped shape and, as illustrated in FIG. 4, extend in the Y direction. Additionally, as illustrated in FIG. 2, the first light transmitting regions 32 extend from the first light transmitting substrate 10 toward the second light transmitting substrate 20, perpendicular to the first main surface 10a of the first light transmitting substrate 10, and are continuous with the second light transmitting regions 42.

As illustrated in FIGS. 2 and 4, the first light absorbing regions 34 of the light ray direction controller 100 are regions between adjacent first light transmitting regions 32. As with the first light transmitting regions 32, the first light absorbing regions 34 extend from the first light transmitting substrate 10 toward the second light transmitting substrate 20, perpendicular to the first main surface 10a of the first light transmitting substrate 10. Details of the first light absorbing regions 34 are described later.

As with the first light transmitting regions 32, the second light transmitting regions 42 of the light ray direction controller 100 are regions that transmit visible light. In one example, the second light transmitting regions 42 are light transmitting layers formed from light transmitting resin. The second light transmitting regions 42 are provided on the first main surface 20a of the second light transmitting substrate 20. In the present embodiment, a plurality of second light transmitting regions 42 is arranged in the X direction at the same spacing as the first light transmitting regions 32. The second light transmitting regions 42 have an oblique quadrangular prism shape and, as illustrated in FIG. 4, extend in the Y direction. Additionally, the second light transmitting regions 42 extend from the second light transmitting substrate 20 toward the first light transmitting substrate 10, and are continuous with the first light transmitting regions 32. As illustrated in FIG. 2, when viewing a cross-section (the XZ plane) perpendicular to the first main surface 10a of the first light transmitting substrate 10 and the first main surface 20a of the second light transmitting substrate 20, the second light transmitting regions 42 are inclined at an angle $\theta$ to the +X direction side with respect to the direction (the +Z direction) perpendicular to the first main surface 10a of the first light transmitting substrate 10. In the present embodiment, the angle $\theta$ satisfies $\tan\theta \geq D1/H2$, where H2 is a height in the Z direction of the second light transmitting regions 42, and D1 is a width in the X direction of the first light transmitting regions 32 and the second light transmitting regions 42.

The second light transmitting regions 42 are inclined with respect to the direction perpendicular to the first main surface 10a of the first light transmitting substrate 10, and the first light transmitting regions 32 extend perpendicular to the first main surface 10a of the first light transmitting substrate 10. Accordingly, when viewing a cross-section (the XZ plane) perpendicular to the first main surface 10a of the first light transmitting substrate 10 and the first main surface 20a of the second light transmitting substrate 20, as illustrated in FIG. 2, the angles of inclination, with respect to the first main surface 10a of the first light transmitting substrate 10, of the first light transmitting regions 32 and the second light transmitting regions 42 differ. Note that, in one example, a ratio of a sum H of a height H1 in the Z direction of the first light transmitting regions 32 and the height H2 in the Z direction of the second light transmitting regions 42 to the width D1 in the X direction of the first light transmitting regions 32 and the second light transmitting regions 42 is from 4:1 to 3:1.

As illustrated in FIGS. 2 and 4, the second light absorbing regions 44 of the light ray direction controller 100 are regions between adjacent second light transmitting regions 42. When viewing a cross-section on the XZ plane, the second light transmitting regions 42 are inclined the angle θ to the +X direction side with respect to the +Z direction and, as such, the second light absorbing regions 44 are also inclined the angle θ to the +X direction side with respect to the +Z direction. As with the second light transmitting regions 42, the second light absorbing regions 44 extend from the second light transmitting substrate 20 toward the first light transmitting substrate 10, and are continuous with the first light absorbing regions 34. Details of the second light absorbing regions 44 are described later.

The light transmitting dispersion medium 52 of the light ray direction controller 100 is enclosed in the first light absorbing regions 34 and the second light absorbing regions 44. The light transmitting dispersion medium 52 transmits visible light. The light transmitting dispersion medium 52 disperses the electrophoretic particles 54.

The electrophoretic particles 54 of the light ray direction controller 100 are dispersed in the light transmitting dispersion medium 52 and absorb visible light. The electrophoretic particles 54 are positively or negatively charged, and the dispersion state of the electrophoretic particles 54 in the light transmitting dispersion medium 52 changes according to voltage applied by the first light transmitting electrode 12 and the second light transmitting electrode 22. In one example, the electrophoretic particles 54 are implemented as charged carbon black particles. In the present embodiment, it is assumed that the electrophoretic particles 54 are negatively charged.

Next, the first light absorbing regions 34 and the second light absorbing regions 44 are described.

The light transmitting dispersion medium 52 and the electrophoretic particles 54 dispersed in the light transmitting dispersion medium 52 are enclosed in the first light absorbing regions 34 and the second light absorbing regions 44. Accordingly, the first light absorbing regions 34 and the second light absorbing regions 44 function as electrophoretic element together with the first light transmitting electrode 12 and the second light transmitting electrode 22.

When a potential V1 of the first light transmitting electrode 12 and a potential V2 of the second light transmitting electrode 22 are equal and voltage is not being applied to the electrophoretic particles 54, the electrophoretic particles 54 are dispersed uniformly throughout the entirety of the first light absorbing regions 34 and the second light absorbing regions 44, and the entirety of the first light absorbing regions 34 and the second light absorbing regions 44 function as light absorbing layers. By controlling the potential V1 of the first light transmitting electrode 12 and the potential V2 of the second light transmitting electrode 22, the electrophoretic particles 54 can be dispersed in only the first light absorbing regions 34, only the second light absorbing regions 44, or the like, and the regions corresponding to the dispersion state of the electrophoretic particles 54 can be caused to function as light absorbing layers. The dispersion states of the electrophoretic particles 54 and the operations of the light ray direction control element 200 are discussed later.

The voltage controller 110 of the light ray direction control element 200 controls the potential V1 of the first light transmitting electrode 12 and the potential V2 of the second light transmitting electrode 22 to control the voltage to be applied to the electrophoretic particles 54. In one example, the voltage controller 110 is implemented as a control circuit that includes a controller, a power supply circuit, and the like.

Next, the operations of the light ray direction control element 200 are described. In this description of the operations of the light ray direction control element 200, it is assumed that a surface light source (uniformly diffusing surface light source) 500 that has a constant brightness regardless of the viewing direction is disposed on the first light transmitting substrate 10 side of the light ray direction controller 100. The light ray direction control element 200 controls the angle distribution of light 510 that enters from the −Z direction to emit in the +Z direction.

Light-Blocking Mode

When the voltage controller 110 performs control such that the potential V1 of the first light transmitting electrode 12 and the potential V2 of the second light transmitting electrode 22 are equal (V1=V2), the electrophoretic particles 54 are dispersed uniformly throughout the entirety of the first light absorbing regions 34 and the second light absorbing regions 44, Accordingly, the first light absorbing regions 34 and the second light absorbing regions 44 function as light absorbing layers.

Figure 5:
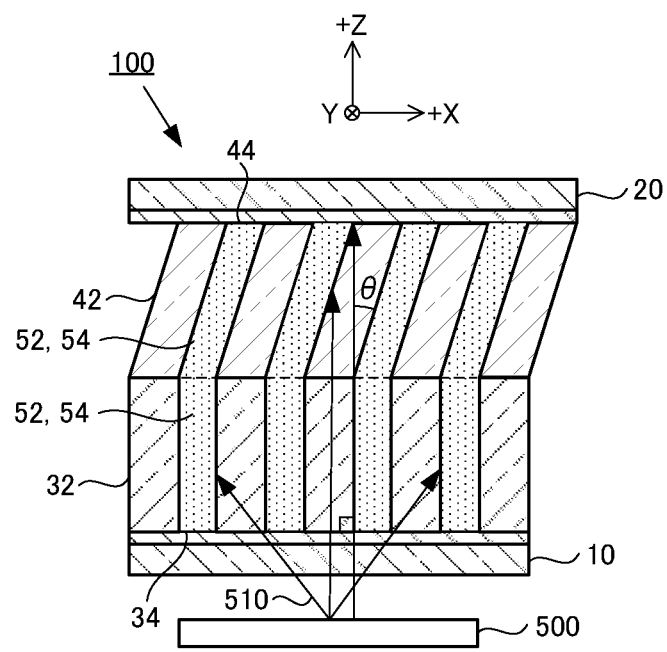
FIG. 5 is a schematic drawing illustrating a light-blocking mode according to Embodiment 1

When viewing a cross-section on the XZ plane, the first light absorbing regions 34 are perpendicular to the first main surface 10a of the first light transmitting substrate 10, and the second light absorbing regions 44 are inclined the angle θ (tan θ≥D1/H2) to the +X direction side with respect to the Z direction. As such, as illustrated in FIG. 5, the first light absorbing regions 34 and the second light absorbing regions 44 that function as light absorbing layers absorb all of the light 510 that enters from the surface light source 500. Additionally, since the first light absorbing regions 34 and the second light absorbing regions 44 extend in the Y direction, when viewing a cross-section on the YZ plane as well, the first light absorbing regions 34 and the second light absorbing regions 44 that function as light absorbing layers absorb all of the light 510 that enters from the surface light source 500. Accordingly, when the potential V1 of the first light transmitting electrode 12 and the potential V2 of the second light transmitting electrode 22 are equal, the light ray direction control element 200 blocks the light 510 of the surface light source 500. In the following, this state is referred to as the "light-blocking mode." In the light-blocking mode, the light ray direction control element 200 blocks the emitted light of the display panel 210.

First Diagonal Narrow Field Mode

Figure 6:
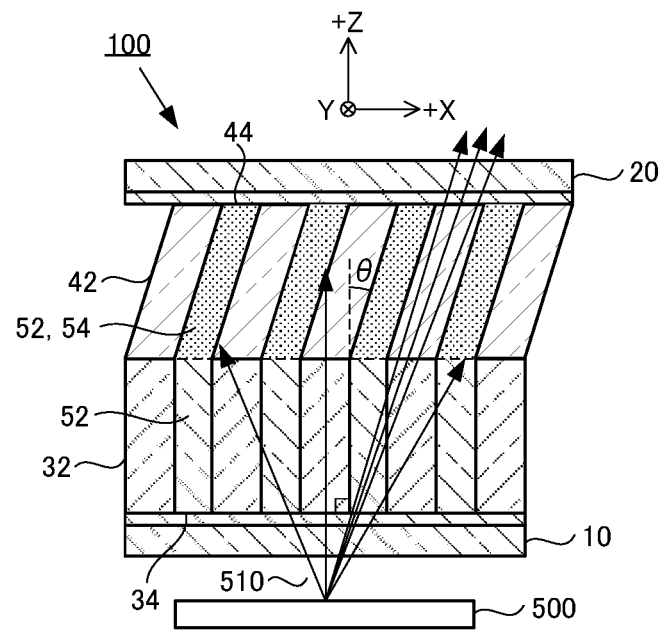
FIG. 6 is a schematic drawing illustrating a first diagonal narrow field mode according to Embodiment 1.

When the voltage controller 110 performs control such that the potential V2 of the second light transmitting electrode 22 is greater than the potential V1 of the first light transmitting electrode 12 (V2>V1), the negatively charged electrophoretic particles 54 aggregate in the second light absorbing regions 44 and are dispersed in the second light absorbing regions 44 as illustrated in FIG. 6. Meanwhile, there are nearly no electrophoretic particles 54 in the first light absorbing regions 34. Accordingly, only the second light absorbing regions 44 function as light absorbing layers. In the following, this state is referred to as the "first diagonal narrow field mode."

Figure 7:
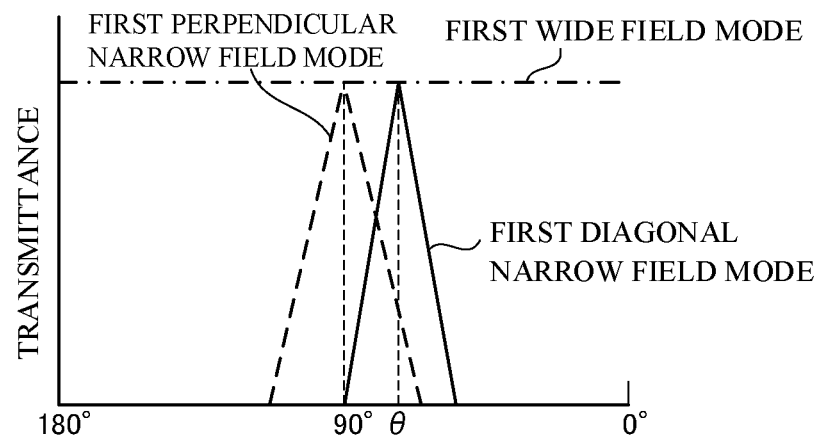
FIG. 7 is a drawing illustrating an angle distribution of emitted light of the light ray direction control element according to Embodiment 1, in a plane parallel to an XZ plane.

When viewing a cross-section on the XZ plane, the second light absorbing regions 44 and the second light transmitting regions 42 are inclined the angle θ (tan θ≥D1/H2) to the +X direction side with respect to the Z direction. Accordingly, in the first diagonal narrow field mode, of the light 510 that enters from the surface light source 500, the light that has an angle, to the +X direction side with respect to the Z direction, near the angle θ is not absorbed by the second light absorbing regions 44 and exits from the light ray direction controller 100. Additionally, in the XZ plane, the light other than the light that has an angle, to the +X direction side with respect to the Z direction, near the angle θ is absorbed by the second light absorbing regions 44. Accordingly, in a plane parallel to the XZ plane, when the +X direction is 0°, the +Z direction is 90°, and the −X direction is 180°, the emitted light of the light ray direction control element 200 in the first diagonal narrow field mode has a narrow angle distribution near 90°−θ, as illustrated in FIG. 7. Note that, in the following embodiments as well, descriptions are given in which, for the angle distribution of the emitted light of the light ray direction control element 200 in a plane parallel to the XZ plane, the +X direction is 0°, the +Z direction is 90°, and the −X direction is 180°. The plane parallel to the XZ plane includes the XZ plane.

In the present embodiment, the second light transmitting regions 42 and the second light absorbing regions 44, that are inclined the angle θ (tan θ≥D1/H2) to the +X direction side, extend in the Y direction. Accordingly, in a plane parallel to a plane inclined to the +X direction side with respect to the YZ plane (0°<angle of inclination<2×θ), the emitted light of the light ray direction control element 200 in the first diagonal narrow field mode has a uniform angle distribution.

As described above, the emitted light of the light ray direction control element 200 in the first diagonal narrow field mode has a narrow angle distribution near 90°−θ in a plane parallel to the XZ plane, and has a uniform angle distribution in a plane parallel to the plane inclined to the +X direction side with respect to the YZ plane. Accordingly, in the first diagonal narrow field mode, the light ray direction control element 200 can limit the viewing angle in the left-right direction (the X direction) of the display device 300 to near the angle θ of the right direction (the +X direction) with respect to the front surface (the +Z direction).

First Perpendicular Narrow Field Mode

Figure 8:
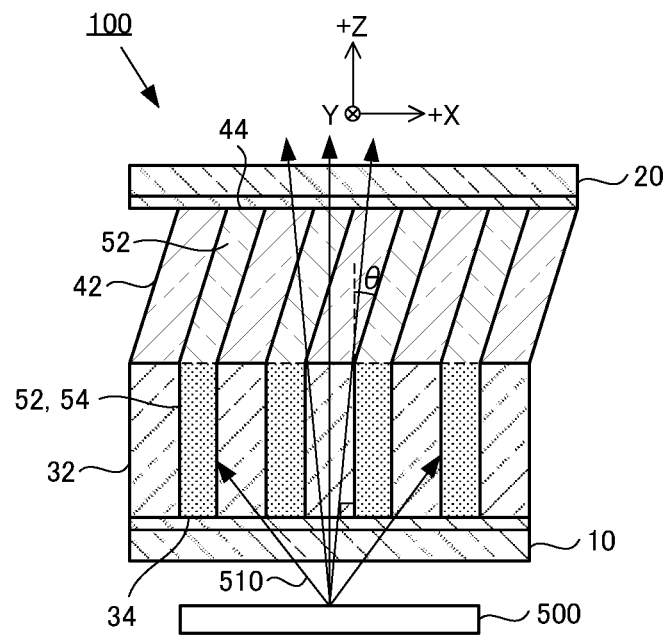
FIG. 8 is a schematic drawing illustrating a first perpendicular narrow field mode according to Embodiment 1.

When voltage controller 110 performs control such that the potential V1 of the first light transmitting electrode 12 is greater than the potential V2 of the second light transmitting electrode 22 (V1>V2), the negatively charged electrophoretic particles 54 aggregate in the first light absorbing regions 34 and are dispersed in the first light absorbing regions 34 as illustrated in FIG. 8. Meanwhile, there are nearly no electrophoretic particles 54 in the second light absorbing regions 44. Accordingly, only the first light absorbing regions 34 function as light absorbing layers. In the following, this state is referred to as the "first perpendicular narrow field mode."

When viewing a cross-section on the XZ plane, the first light absorbing regions 34 and the first light transmitting regions 32 are perpendicular to the first main surface 10a of the first light transmitting substrate 10. As such, in the first perpendicular narrow field mode, of the light 510 that enters from the surface light source 500, the light other than that near the +Z direction is absorbed by the first light absorbing regions 34 as illustrated in FIG. 8. Additionally, on the XZ plane, of the light 510 that enters from the surface light source 500, the light near the +Z direction exits from the light ray direction controller 100. Accordingly, in a plane parallel to the XZ plane, the emitted light of the light ray direction control element 200 in the first perpendicular narrow field mode has a narrow angle distribution near 90° (the +Z direction), as illustrated in FIG. 7.

In a plane parallel to the YZ plane, the first light transmitting regions 32 and the first light absorbing regions 34 extend in the Y direction and, as such, the emitted light of the light ray direction control element 200 in the first perpendicular narrow field mode has a uniform angle distribution. Note that the plane parallel to the YZ plane includes the YZ plane.

As described above, the emitted light of the light ray direction control element 200 in the first perpendicular narrow field mode has a narrow angle distribution near 90° (the +Z direction) in a plane parallel to the XZ plane, and has a uniform angle distribution in a plane parallel to the YZ plane. Accordingly, in the first perpendicular narrow field mode, the light ray direction control element 200 can limit the viewing angle in the left-right direction (the X direction) of the display device 300 to near the front surface (the +Z direction).

First Wide Field Mode

Figure 9:
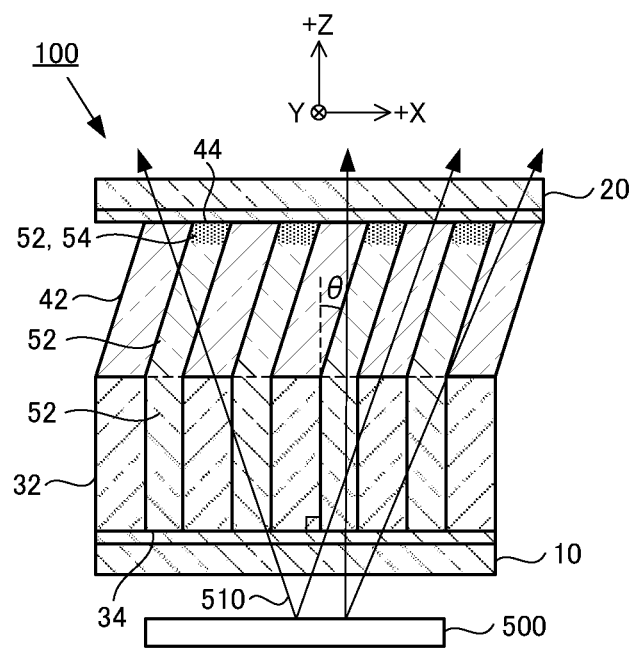
FIG. 9 is a schematic drawing illustrating a first wide field mode according to Embodiment 1.

When the voltage controller 110 performs control such that the potential V2 of the second light transmitting electrode 22 is greater than the potential V1 of the first light transmitting electrode 12 and a difference between the potential V2 and the potential V1 is greater than in the first diagonal narrow field mode (V2>>V1), the negatively charged electrophoretic particles 54 aggregate on the second light transmitting electrode 22 side of the second light absorbing regions 44 as illustrated in FIG. 9. Accordingly, the first light absorbing regions 34 and the second light absorbing regions 44 hardly function as light absorbing layers. In the following, this state is referred to as the "first wide field mode."

In the first wide field mode, the first light absorbing regions 34 and the second light absorbing regions 44 hardly function as light absorbing layers. Accordingly, in a plane parallel to the XZ plane, the emitted light of the light ray direction control element 200 in the first wide field mode has a uniform angle distribution as illustrated in FIG. 7. Additionally, in a plane parallel to the YZ plane, the emitted light of the light ray direction control element 200 in the first wide field mode has a uniform angle distribution. In the first wide field mode, the light ray direction control element 200 does not limit the viewing angle of the display device 300.

Second Wide Field Mode

Figure 10:
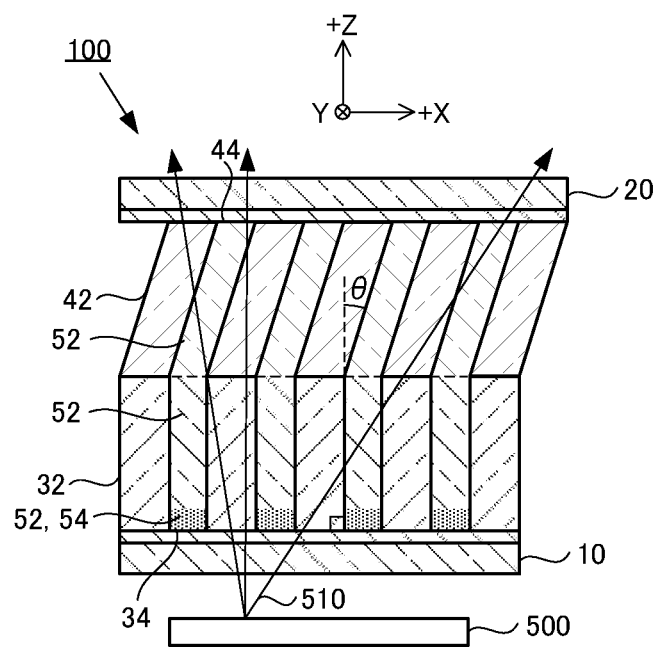
FIG. 10 is a schematic drawing illustrating a second wide field mode according to Embodiment 1.

When the voltage controller 110 performs control such that the potential V1 of the first light transmitting electrode 12 is greater than the potential V2 of the second light transmitting electrode 22 and the difference between the potential V1 and the potential V2 is greater than in the first perpendicular narrow field mode (V1>>V2), the negatively charged electrophoretic particles 54 aggregate on the first light transmitting electrode 12 side of the first light absorbing regions 34 as illustrated in FIG. 10. Accordingly, the first light absorbing regions 34 and the second light absorbing regions 44 hardly function as light absorbing layers. In the following, this state is referred to as the "second wide field mode."

In the second wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the second wide field mode has a uniform angle distribution, as in the first wide field mode. In the second wide field mode, the light ray direction control element 200 does not limit the viewing angle of the display device 300.

Thus, with the light ray direction control element 200, it is possible to emit light in three or more types of angle distributions by controlling the potential V1 of the first light transmitting electrode 12 and the potential V2 of the second light transmitting electrode 22 (the voltage applied to the electrophoretic particles 54).

In the light ray direction control element 200, when transitioning from the light-blocking mode to the first diagonal narrow field mode, it is preferable to transition from the light-blocking mode to the first diagonal narrow field mode via the first wide field mode. Additionally, when transitioning from the light-blocking mode to the first perpendicular narrow field mode, it is preferable to transition from the light-blocking mode to the first perpendicular narrow field mode via the second wide field mode. By doing so, the electrophoretic particles 54 with stably disperse in the first light absorbing regions 34 or the second light absorbing regions 44, and mode transition reproducibility can be improved.

Next, a specific example of transitioning from the light-blocking mode to the first diagonal narrow field mode is described.

The voltage controller 110 controls the voltage applied to the electrophoretic particles 54 to cause the dispersion state of the electrophoretic particles 54 to transition from a dispersion state in which the electrophoretic particles 54 are dispersed in the first light absorbing regions 34 and the second light absorbing regions 44 (the light-blocking mode) to a dispersion state in which the electrophoretic particles 54 are dispersed in the second light absorbing regions 44 but are not dispersed in the first light absorbing regions 34 (the first diagonal narrow field mode). In the light-blocking mode, voltage is not applied to the electrophoretic particles 54. In the first diagonal narrow field mode, voltage of a first voltage value (V2>V1) is applied to the electrophoretic particles 54. In this case, the voltage controller 110 first applies voltage of a second voltage value (V2>>V1) greater than the first voltage value to the electrophoretic particles 54 to cause the electrophoretic particles 54 to transition from the dispersion state in which the electrophoretic particles 54 are dispersed in the first light absorbing regions 34 and the second light absorbing regions 44, to the dispersion state in which the electrophoretic particles 54 are dispersed in the second light absorbing regions 44 but are not dispersed in the first light absorbing regions 34, via the dispersion state (the first wide field mode) in which the electrophoretic particles 54 are aggregated in the second light absorbing regions 44. As a result, the electrophoretic particles 54 are first aggregated in the second light absorbing regions 44 and, then, are dispersed in the second light absorbing regions 44 and, as such, a stable dispersion state can be formed. Note that the same is applicable when transitioning from the light-blocking mode to the first perpendicular narrow field mode.

Figure 11:
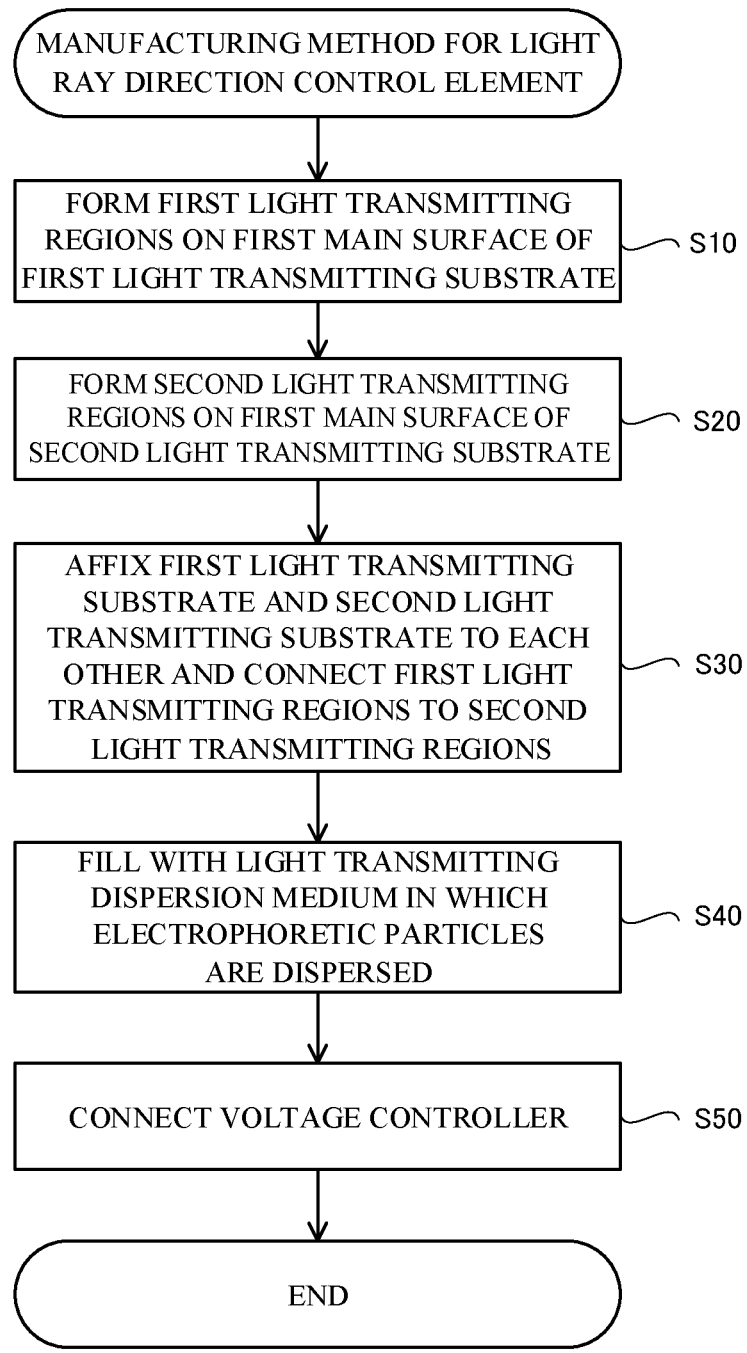
FIG. 11 is a flowchart illustrating a manufacturing method for the light ray direction control element according to Embodiment 1.

Next, a manufacturing method of the light ray direction control element 200 is described. FIG. 11 is a flowchart illustrating a manufacturing method for the light ray direction control element 200. The manufacturing method for the light ray direction control element 200 includes forming the first light transmitting regions 32 on the first main surface 10a of the first light transmitting substrate 10 (step S10), forming the second light transmitting regions 42 on the first main surface 20a of the second light transmitting substrate 20 (step S20), adhering the first light transmitting substrate 10 and the second light transmitting substrate 20 to each other to connect the first light transmitting regions 32 to the second light transmitting regions 42 (step S30), filling with the light transmitting dispersion medium 52 in which the electrophoretic particles 54 are dispersed (step S40), and electrically connecting the voltage controller 110 (step S50).

In step S10, a known photolithography technique is used to form the first light transmitting regions 32 on the first main surface 10a of the first light transmitting substrate 10 on which the first light transmitting electrode 12 and the insulation layer are provided. In one example, the first light transmitting regions 32 are formed from a chemically amplified photoresist called SU-8 (product name, Nippon Kayaku Co., Ltd.).

As in step S10, in step S20, the second light transmitting regions 42 are formed on the first main surface 20a of the second light transmitting substrate 20 on which the second light transmitting electrode 22 and the insulation layer are provided.

In step S30, the first main surface 10a of the first light transmitting substrate 10 and the first main surface 20a of the second light transmitting substrate 20 are caused to face each other, thereby stacking the second light transmitting substrate 20 on the first light transmitting substrate 10. In this case, the second light transmitting substrate 20 may be stacked directly on the first light transmitting substrate 10, or the first light transmitting substrate 10 and the second light transmitting substrate 20 may be adhered to each other by an adhesive. As a result, the first light transmitting regions 32 are connected to the second light transmitting regions 42. The adhesive is a thermosetting adhesive, an ultraviolet (UV) curing adhesive, or the like.

In step S40, space between adjacent first light transmitting regions 32 and space between adjacent second light transmitting regions 42 are filled with the light transmitting dispersion medium 52 in which the electrophoretic particles 54 are dispersed. As a result, the first light absorbing regions 34 and the second light absorbing regions 44 are formed. The first light absorbing regions 34 and the second light absorbing regions 44 are sealed by an adhesive.

In step S50, the voltage controller 110 is electrically connected to the first light transmitting electrode 12 and the second light transmitting electrode 22. Thus, the light ray direction control element 200 can be manufactured.

As described above, when viewing a cross-section on the XZ plane, the angles of inclination, with respect to the first main surface 10a of the first light transmitting substrate 10, of the first light transmitting regions 32 and the second light transmitting regions 42 differ and, as such, the light ray direction control element 200 can emit light in three or more types of angle distributions by controlling the potential V1 of the first light transmitting electrode 12 and the potential V2 of the second light transmitting electrode 22 (the voltage applied to the electrophoretic particles 54).

Embodiment 2

The first light transmitting regions 32 and the first light absorbing regions 34 of Embodiment 1 are perpendicular to the first main surface 10a of the first light transmitting substrate 10. However, a configuration is possible in which, when viewing a cross-section on the XZ plane, the first light transmitting regions 32 and the first light absorbing regions 34 are inclined with respect to the direction (the +Z direction) perpendicular to the first main surface 10a of the first light transmitting substrate 10.

In the light ray direction control element 200 of the present embodiment, the configurations of the first light transmitting regions 32 and the first light absorbing regions 34 differ from the configurations of the first light transmitting regions 32 and the first light absorbing regions 34 of Embodiment 1. The other configurations of the light ray direction control element 200 of the present embodiment are the same as the configurations of the light ray direction control element 200 of Embodiment 1. Next, the configurations of the first light transmitting regions 32 and the first light absorbing regions 34, and the operations of the light ray direction control element 200 are described.

As with the first light transmitting regions 32 of Embodiment 1, the first light transmitting regions 32 of the present embodiment are regions that transmit visible light. Additionally, the first light transmitting regions 32 of the present embodiment are provided on the first main surface 10a of the first light transmitting substrate 10.

Figure 12:
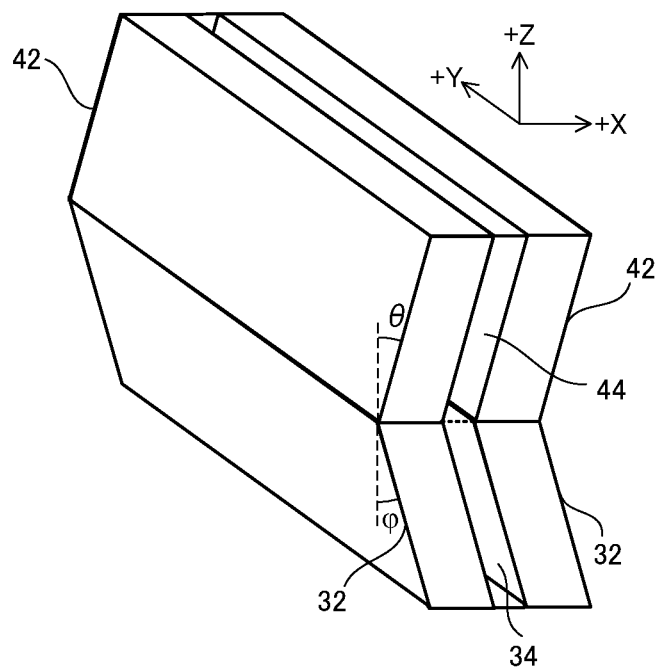
FIG. 12 is a perspective view illustrating first light transmitting regions, first light absorbing regions, second light transmitting regions, and second light absorbing regions according to Embodiment 2.
Figure 13:
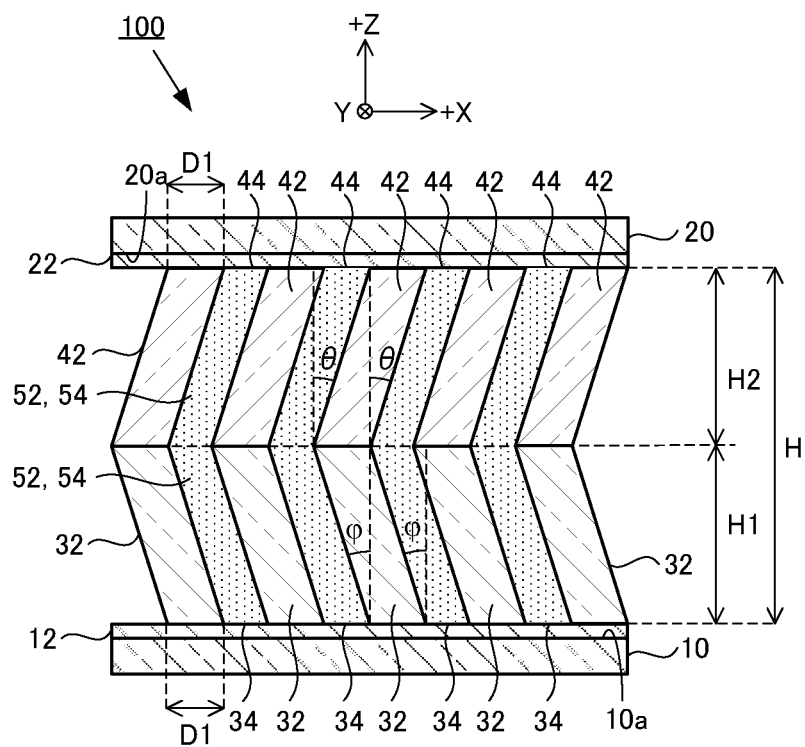
FIG. 13 is a cross-sectional view illustrating a light ray direction controller according to Embodiment 2.

As with the second light transmitting regions 42, as illustrated in FIG. 12, the first light transmitting regions 32 of the present embodiment have an oblique quadrangular prism shape and are arranged in the X direction. As illustrated in FIG. 13, when viewing a cross-section (XZ plane) perpendicular to the first main surface 10a of the first light transmitting substrate 10 and the first main surface 20a of the second light transmitting substrate 20, the first light transmitting regions 32 of the present embodiment are inclined at an angle φ (tan φ≥D1/H1) to the −X direction side with respect to the direction (the +Z direction) perpendicular to the first main surface 10a of the first light transmitting substrate 10. That is, the first light transmitting regions 32 of the present embodiment are inclined in the reverse direction of the second light transmitting regions 42 with respect to the +Z direction. The other configurations of the first light transmitting regions 32 of the present embodiment are the same as the configurations of the first light transmitting regions 32 of Embodiment 1.

As with the first light absorbing regions 34 of Embodiment 1, the first light absorbing regions 34 of the present embodiment are regions between adjacent first light transmitting regions 32. When viewing a cross-section on the XZ plane, the first light transmitting regions 32 are inclined the angle φ to the −X direction side with respect to the +Z direction and, as such, the first light absorbing regions 34 of the present embodiment are also inclined the angle φ to the −X direction side with respect to the +Z direction. The other configurations of the first light absorbing regions 34 of the present embodiment are the same as the configurations of the first light absorbing regions 34 of Embodiment 1.

Next, the operations of the light ray direction control element 200 of the present embodiment are described. As in Embodiment 1, the operations of the light ray direction control element 200 of the present embodiment are described under the assumption that the surface light source 500 is disposed on the first light transmitting substrate 10 side of the light ray direction controller 100.

Light-Blocking Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in Embodiment 1.

When viewing a cross-section on the XZ plane, the first light absorbing regions 34 are inclined the angle φ (tan φ≥D1/H1) to the −X direction side with respect to the Z direction, and the second light absorbing regions 44 are inclined the angle θ (tan θ≥D1/H2) to the +X direction side with respect to the Z direction. As such, as with the light-blocking mode of Embodiment 1, the first light absorbing regions 34 and the second light absorbing regions 44 that function as light absorbing layers absorb all of the light 510 that enters from the surface light source 500. Additionally, since the first light absorbing regions 34 and the second light absorbing regions 44 extend in the Y direction, when viewing a cross-section on the YZ plane as well, the first light absorbing regions 34 and the second light absorbing regions 44 that function as light absorbing layers absorb all of the light 510 that enters from the surface light source 500. Accordingly, when the potential V1 of the first light transmitting electrode 12 and the potential V2 of the second light transmitting electrode 22 are equal, as with the light ray direction control element 200 of Embodiment 1, the light ray direction control element 200 of the present embodiment blocks the light 510 of the surface light source 500. That is, the light ray direction control element 200 blocks the emitted light of the display panel 210.

Second Diagonal Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in Embodiment 1. In the following, this state is referred to as the "second diagonal narrow field mode."

The configuration of the second light absorbing regions 44 of the present embodiment is the same as that of the second light absorbing regions 44 of Embodiment 1. As such, in the XZ plane in the second diagonal narrow field mode, of the light 510 that enters from the surface light source 500, the light that has an angle, to the +X direction side with respect to the Z direction, near the angle θ exits from the light ray direction controller 100. Additionally, in the XZ plane of the second diagonal narrow field mode, the light other than the light that has an angle, to the +X direction side with respect to the Z direction, near the angle θ is absorbed by the second light absorbing regions 44. Accordingly, in a plane parallel to the XZ plane, the emitted light of the light ray direction control element 200 in the second diagonal narrow field mode has a narrow angle distribution near 90°−θ, the same as in the first diagonal narrow field mode (FIGS. 6 and 7) of Embodiment 1.

The second light transmitting regions 42 and the second light absorbing regions 44 that are inclined the angle θ (tan θ≥D1/H2) to the +X direction side extend in the Y direction and, as such, in a plane parallel to a plane inclined to the +X direction side with respect to the YZ plane (0°<angle of inclination<2×θ), the emitted light of the light ray direction control element 200 in the second diagonal narrow field mode has a uniform angle distribution.

As described above, the emitted light of the light ray direction control element 200 in the second diagonal narrow field mode has a narrow angle distribution near 90°−θ in a plane parallel to the XZ plane, and has a uniform angle distribution in a plane parallel to a plane inclined to the +X direction side with respect to the YZ plane. Accordingly, in the second diagonal narrow field mode, the light ray direction control element 200 can limit the viewing angle in the left-right direction (the X direction) of the display device 300 to near the angle θ of the right direction (the +X direction) with respect to the front surface (the +Z direction).

Third Diagonal Narrow Field Mode

Figure 14:
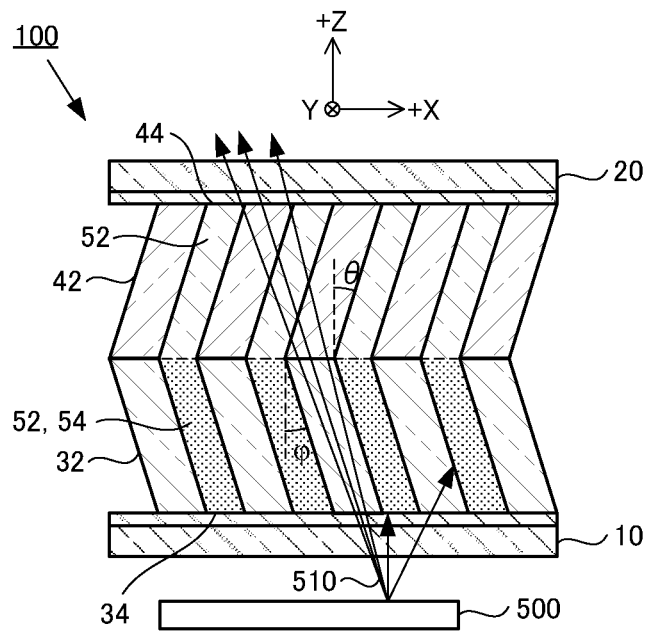
FIG. 14 is a schematic drawing illustrating a third diagonal narrow field mode according to Embodiment 2.

When the voltage controller 110 performs control such that the potential V1 of the first light transmitting electrode 12 is greater than the potential V2 of the second light transmitting electrode 22 (V1>V2), the electrophoretic particles 54 aggregate in the first light absorbing regions 34 and are dispersed in the first light absorbing regions 34 as illustrated in FIG. 14. Meanwhile, there are nearly no electrophoretic particles 54 in the second light absorbing regions 44. Accordingly, only the first light absorbing regions 34 function as light absorbing layers. In the following, this state is referred to as the "third diagonal narrow field mode."

Figure 15:
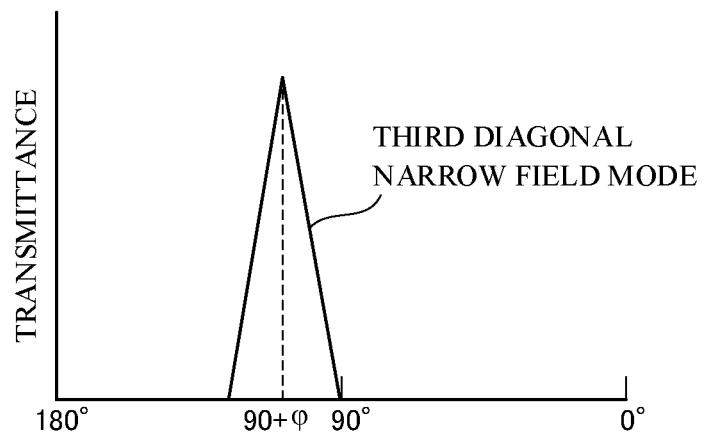
FIG. 15 is a drawing illustrating an angle distribution of emitted light of the light ray direction control element according to Embodiment 2, in a plane parallel to an XZ plane.

When viewing a cross-section on the XZ plane, the first light absorbing regions 34 and the first light transmitting regions 32 are inclined the angle φ (tan φ≥D1/H1) to the −X direction side with respect to the +Z direction. As such, in the third diagonal narrow field mode, of the light 510 that enters from the surface light source 500, the light that has an angle, to the −X direction side with respect to the Z direction, near the angle φ exits from the light ray direction controller 100 without being absorbed by the first light absorbing regions 34. Additionally, in the XZ plane, the light other than the light that has an angle, to the +X direction side with respect to the +Z direction, near the angle θ is absorbed by the first light absorbing regions 34. Accordingly, in a plane parallel to the XZ plane, the emitted light of the light ray direction control element 200 in the third diagonal narrow field mode has a narrow angle distribution near 90°+φ, as illustrated in FIG. 15.

The first light transmitting regions 32 and the first light absorbing regions 34 inclined the angle φ (tan φ≥D1/H1) to the −X direction side extend in the Y direction and, as such, in a plane parallel to a plane inclined to the −X direction side with respect to the YZ plane (0°<angle of inclination<2×φ), the emitted light of the light ray direction control element 200 in the third diagonal narrow field mode has a uniform angle distribution.

As described above, the emitted light of the light ray direction control element 200 in the third diagonal narrow field mode has a narrow angle distribution near 90°+φ in a plane parallel to the XZ plane, and has a uniform angle distribution in a plane parallel to a plane inclined to the −X direction side with respect to the YZ plane. Accordingly, in the third diagonal narrow field mode, the light ray direction control element 200 can limit the viewing angle in the left-right direction (the X direction) of the display device 300 to near the angle φ of the left direction (the −X direction) with respect to the front surface (the +Z direction).

Third Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the second diagonal narrow field mode (V2>>V1), as in the first wide field mode of Embodiment 1, the electrophoretic particles 54 aggregate on the second light transmitting electrode 22 side of the second light absorbing regions 44 (hereinafter referred to as the "third wide field mode"). Accordingly, in a plane parallel to the XZ plane and in a plane parallel to the YZ plane, the emitted light of the light ray direction control element 200 in the third wide field mode has a uniform angle distribution, as in the first wide field mode of Embodiment 1. In the third wide field mode, the light ray direction control element 200 does not limit the viewing angle of the display device 300.

Fourth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the third diagonal narrow field mode (V1>>V2), as in the second wide field mode of Embodiment 1, the electrophoretic particles 54 aggregate on the first light transmitting electrode 12 side of the first light absorbing regions 34 (hereinafter referred to as the "fourth wide field mode"). Accordingly, in a plane parallel to the XZ plane and in a plane parallel to the YZ plane, the emitted light of the light ray direction control element 200 in the fourth wide field mode has a uniform angle distribution, as in the second wide field mode of Embodiment 1. In the fourth wide field mode, the light ray direction control element 200 does not limit the viewing angle of the display device 300.

Thus, when viewing a cross-section on the XZ plane, the angles of inclination, with respect to the first main surface 10a of the first light transmitting substrate 10, of the first light transmitting regions 32 and the second light transmitting regions 42 differ and, as such, the light ray direction control element 200 of the present embodiment can emit light in three or more types of angle distributions by controlling the potential V1 of the first light transmitting electrode 12 and the potential V2 of the second light transmitting electrode 22.

Embodiment 3

A configuration is possible in which the first light transmitting regions 32 and the second light transmitting regions 42 of the light ray direction controller 100 are arranged in the X direction and the Y direction. In the light ray direction control element 200 of the present embodiment, the configurations of the first light transmitting regions 32, the first light absorbing regions 34, the second light transmitting regions 42, and the second light absorbing regions 44 differ from those of Embodiment 1. The other configurations of the light ray direction control element 200 of the present embodiment are the same as the configurations of the light ray direction control element 200 of Embodiment 1. Next, the configurations of the first light transmitting regions 32, the first light absorbing regions 34, the second light transmitting regions 42, and the second light absorbing regions 44, and the operations of the light ray direction control element 200 are described.

As with the first light transmitting regions 32 of Embodiment 1, the first light transmitting regions 32 of the present embodiment are regions that transmit visible light. Additionally, the first light transmitting regions 32 of the present embodiment are provided on the first main surface 10a of the first light transmitting substrate 10.

Figure 16:
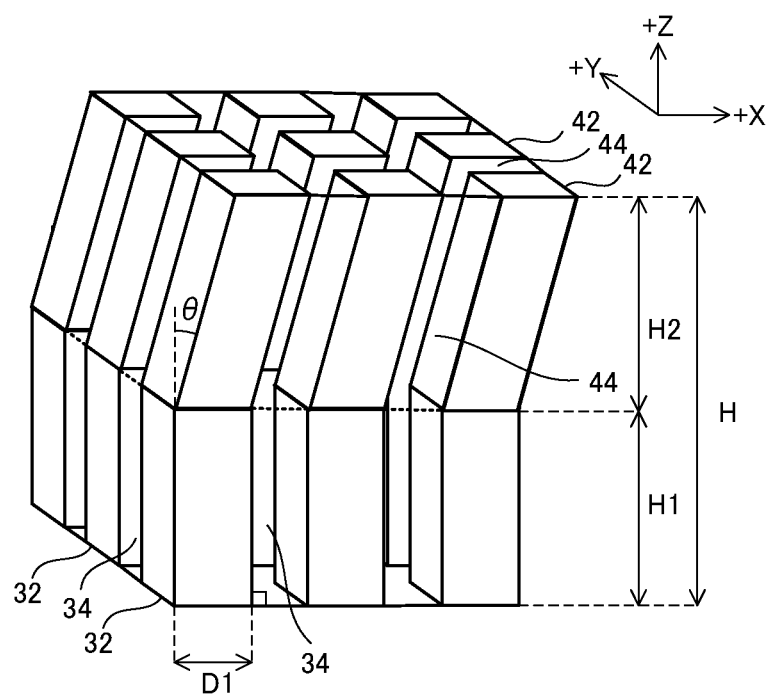
FIG. 16 is a perspective view illustrating first light transmitting regions, first light absorbing regions, second light transmitting regions, and second light absorbing regions according to Embodiment 3.

As illustrated in FIG. 16, the first light transmitting regions 32 of the present embodiment have a quadrangular prism shape and are arranged in a matrix in the X direction and the Y direction. As with the first light transmitting regions 32 of Embodiment 1, the first light transmitting regions 32 of the present embodiment extend from the first light transmitting substrate 10 toward the second light transmitting substrate 20, perpendicular to the first main surface 10a of the first light transmitting substrate 10, and are continuous with the second light transmitting regions 42. The other configurations of the first light transmitting regions 32 of the present embodiment are the same as the configurations of the first light transmitting regions 32 of Embodiment 1.

As with the first light absorbing regions 34 of Embodiment 1, the first light absorbing regions 34 of the present embodiment are regions between adjacent first light transmitting regions 32. In the present embodiment, the quadrangular prism shaped first light transmitting regions 32 are arranged in a matrix and, as such, the first light absorbing regions 34 form a lattice-shaped region. As with the first light transmitting regions 32 of the present embodiment, the first light absorbing regions 34 of the present embodiment are perpendicular to the first main surface 10a of the first light transmitting substrate 10. The other configurations of the first light absorbing regions 34 of the present embodiment are the same as the configurations of the first light absorbing regions 34 of Embodiment 1.

As with the second light transmitting regions 42 of Embodiment 1, the second light transmitting regions 42 of the present embodiment are regions that transmit visible light. The second light transmitting regions 42 of the present embodiment have an oblique quadrangular prism shape and are arranged in a matrix in the X direction and the Y direction. The second light transmitting regions 42 of the present embodiment extend from the second light transmitting substrate 20 toward the first light transmitting substrate 10, and are continuous with the first light transmitting regions 32. As with the second light transmitting regions 42 of Embodiment 1, when viewing a cross-section on the XZ plane, the second light transmitting regions 42 of the present embodiment are inclined the angle θ (tan θ≥D1/H2) to the +X direction side with respect to the Z direction. The other configurations of the second light transmitting regions 42 of the present embodiment are the same as the configurations of the second light transmitting regions 42 of Embodiment 1.

As with the second light absorbing regions 44 of Embodiment 1, the second light absorbing regions 44 of the present embodiment are regions between adjacent second light transmitting regions 42. In the present embodiment, oblique quadrangular prism shaped second light transmitting regions 42 are arranged in a matrix and, as such, the second light absorbing regions 44 of the present embodiment form a lattice-shaped region in which an X direction side surface is inclined the angle θ to the +X direction side. The other configurations of the second light absorbing regions 44 of the present embodiment are the same as the configurations of the second light absorbing regions 44 of Embodiment 1.

Next, the operations of the light ray direction control element 200 of the present embodiment are described. As in Embodiment 1, the operations of the light ray direction control element 200 of the present embodiment are described under the assumption that the surface light source 500 is disposed on the first light transmitting substrate 10 side of the light ray direction controller 100. Note that, in the following embodiment, the operations of the light ray direction control element 200 are described under the assumption that the surface light source 500 is disposed on the first light transmitting substrate 10 side of the light ray direction controller 100.

Light-Blocking Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in Embodiment 1.

When viewing a cross-section on the XZ plane, as with the light-blocking mode of Embodiment 1, the first light absorbing regions 34 and the second light absorbing regions 44 that function as light absorbing layers absorb all of the light 510 that enters from the surface light source 500. Additionally, when viewing a cross-section on the YZ plane as well, the first light absorbing regions 34 and the second light absorbing regions 44 that function as light absorbing layers absorb all of the light 510 that enters from the surface light source 500. Accordingly, when the potential V1 of the first light transmitting electrode 12 and the potential V2 of the second light transmitting electrode 22 are equal, as with the light ray direction control element 200 of Embodiment 1, the light ray direction control element 200 of the present embodiment blocks the light 510 of the surface light source 500. That is, the light ray direction control element 200 blocks the emitted light of the display panel 210.

Fourth Diagonal Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in Embodiment 1. In the following, this state is referred to as the "fourth diagonal narrow field mode."

When viewing a cross-section on a plane parallel to the XZ plane that includes the second light transmitting regions 42, the second light absorbing regions 44 and the second light transmitting regions 42 are inclined the angle θ (tan θ≥D1/H2) to the +X direction side with respect to the Z direction. Accordingly, in a plane parallel to the XZ plane that includes the second light transmitting regions 42, the emitted light of the light ray direction control element 200 in the fourth diagonal narrow field mode has a narrow angle distribution near 90°−θ, the same as in the first diagonal narrow field mode of Embodiment 1. Meanwhile, when viewing a cross-section on a plane parallel to the XZ plane that includes a lattice portion of the second light absorbing regions 44, the second light absorbing regions 44 extend in the X direction and, as such, in the fourth diagonal narrow field mode, the light 510 that enters from the surface light source 500 is absorbed by the second light absorbing regions 44.

When viewing a cross-section on a plane parallel to the plane inclined to the +X direction side with respect to the YZ plane (0°<angle of inclination<2×θ), the second light absorbing regions 44 and the second light transmitting regions 42 are alternately disposed in the Y direction. Accordingly, in a plane parallel to the plane inclined to the +X direction side with respect to the YZ plane (0°<angle of inclination<2×θ), the emitted light of the light ray direction control element 200 in the fourth diagonal narrow field mode has a narrow angle distribution.

As described above, the emitted light of the light ray direction control element 200 in the fourth diagonal narrow field mode has a narrow angle distribution near 90°−θ in a plane parallel to the XZ plane that includes the second light transmitting regions 42, and has a narrow angle distribution in a plane parallel to the plane inclined to the +X direction side with respect to the YZ plane. Accordingly, in the fourth diagonal narrow field mode, the light ray direction control element 200 can limit the viewing angle in the left-right direction (the X direction) of the display device 300 to near the angle θ of the right direction (the +X direction) with respect to the front surface (the +Z direction). Additionally, the light ray direction control element 200 can narrow the viewing angle in the vertical direction (the Y direction) of the display device 300.

Second Perpendicular Narrow Field Mode

When the voltage controller 110 performs control such that the potential V1 of the first light transmitting electrode 12 is greater than the potential V2 of the second light transmitting electrode 22 (V1>V2), only the first light absorbing regions 34 function as light absorbing layers, as in Embodiment 1. In the following, this state is referred to as the "second perpendicular narrow field mode."

When viewing a cross-section on a plane parallel to the XZ plane that includes the first light transmitting regions 32, the first light absorbing regions 34 and the first light transmitting regions 32 are perpendicular to the first main surface 10a of the first light transmitting substrate 10. Accordingly, in a plane parallel to the XZ plane that includes the first light transmitting regions 32, the emitted light of the light ray direction control element 200 in the second perpendicular narrow field mode has a narrow angle distribution near 90° (the +Z direction), the same as in the first perpendicular narrow field mode of Embodiment 1 (FIGS. 7 and 8). Meanwhile, when viewing a cross-section on a plane parallel to the XZ plane that includes a lattice portion of the first light absorbing regions 34, the first light absorbing regions 34 extend in the X direction and, as such, in the second perpendicular narrow field mode, the light 510 that enters from the surface light source 500 is absorbed by the first light absorbing regions 34.

Figure 17:
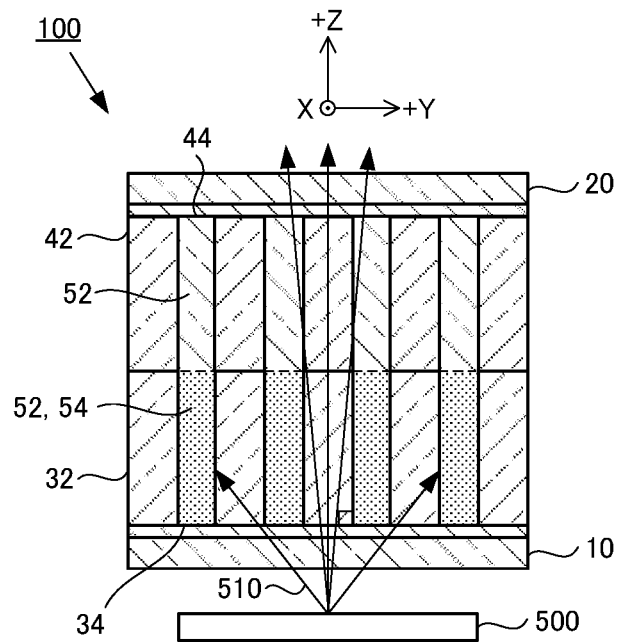
FIG. 17 is a schematic drawing illustrating a second perpendicular narrow field mode according to Embodiment 3.
Figure 18:
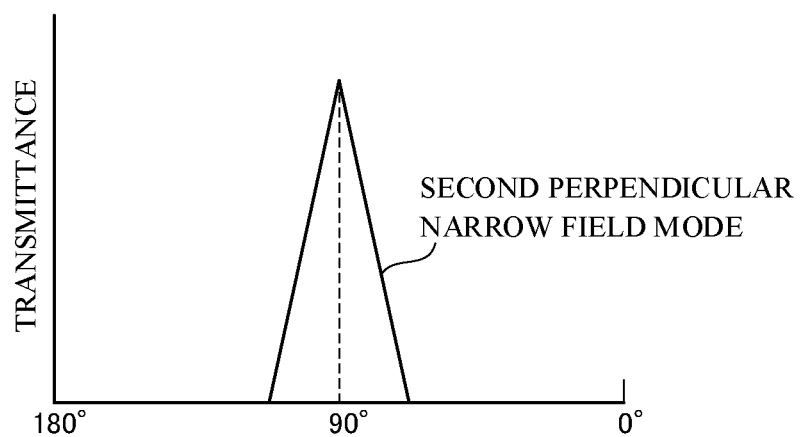
FIG. 18 is a drawing illustrating an angle distribution of emitted light of the light ray direction control element according to Embodiment 3, in a plane parallel to a YZ plane.

When viewing a cross-section on a plane parallel to the YZ plane that includes the first light transmitting regions 32, the first light absorbing regions 34 and the first light transmitting regions 32 of the present embodiment are perpendicular to the first main surface 10a of the first light transmitting substrate 10. As such, in the second perpendicular narrow field mode of the light 510 that enters from the surface light source 500, the light other than that near the +Z direction is absorbed by the first light absorbing regions 34 as illustrated in FIG. 17. Additionally, of the light 510 that enters from the surface light source 500, the light near the +Z direction exits from the light ray direction controller 100. Accordingly, in a plane parallel to the YZ plane, when the +Y direction is 0°, the +Z direction is 90°, and the −Y direction is 180°, in a plane parallel to the YZ plane that includes the first light transmitting regions 32, the emitted light of the light ray direction control element 200 in the second perpendicular narrow field mode has a narrow angle distribution near 90° (the +Z direction), as illustrated in FIG. 18. Meanwhile, when viewing a cross-section on a plane parallel to the YZ plane that includes a lattice portion of the first light absorbing regions 34, the first light absorbing regions 34 extend in the Y direction and, as such, in the second perpendicular narrow field mode, the light 510 that enters from the surface light source 500 is absorbed by the first light absorbing regions 34. Note that, in the following embodiments, descriptions are given in which, for the angle distribution of the emitted light of the light ray direction control element 200 in a plane parallel to the YZ plane (the vertical direction), the +Y direction is 0°, the +Z direction is 90°, and the −Y direction is 180°.

As described above, the emitted light of the light ray direction control element 200 in the second perpendicular narrow field mode has a narrow angle distribution near 90° (the +Z direction) in a plane parallel to the XZ plane that includes the first light transmitting regions 32, and has a narrow angle distribution near 90° (the +Z direction) in a plane parallel to the YZ plane that includes the first light transmitting regions 32. Accordingly, in the second perpendicular narrow field mode, the light ray direction control element 200 can limit the viewing angle of the display device 300 to near the front surface (the +Z direction).

Fifth Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the fourth diagonal narrow field mode (V2>>V1), as in the first wide field mode of Embodiment 1, the electrophoretic particles 54 aggregate on the second light transmitting electrode 22 side of the second light absorbing regions 44 (hereinafter referred to as the "fifth wide field mode"). Accordingly, in a plane parallel to the XZ plane and in a plane parallel to the YZ plane, the emitted light of the light ray direction control element 200 in the fifth wide field mode has a uniform angle distribution, as in the first wide field mode of Embodiment 1. In the fifth wide field mode, the light ray direction control element 200 does not limit the viewing angle of the display device 300.

Sixth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the second perpendicular narrow field mode (V1>>V2), as in the second wide field mode of Embodiment 1, the electrophoretic particles 54 aggregate on the first light transmitting electrode 12 side of the first light absorbing regions 34 (hereinafter referred to as the "sixth wide field mode"). Accordingly, in a plane parallel to the XZ plane and in a plane parallel to the YZ plane, the emitted light of the light ray direction control element 200 in the sixth wide field mode has a uniform angle distribution, as in the second wide field mode of Embodiment 1. In the sixth wide field mode, the light ray direction control element 200 does not limit the viewing angle of the display device 300.

Thus, as with the light ray direction control element 200 of Embodiment 1 and Embodiment 2, the light ray direction control element 200 of the present embodiment can emit light in three or more types of angle distributions by controlling the potential V1 of the first light transmitting electrode 12 and the potential V2 of the second light transmitting electrode 22.

Embodiment 4

A configuration is possible in which, when viewing a cross-section on the XZ plane, the shape of the first light transmitting regions 32 and the shape of the second light transmitting regions 42 are different. With the light ray direction control element 200 of the present embodiment, the configurations of the second light transmitting regions 42 and the second light absorbing regions 44 differ from those of Embodiment 1. The other configurations of the light ray direction control element 200 of the present embodiment are the same as the configurations of the light ray direction control element 200 of Embodiment 1. Next, the configurations of the second light transmitting regions 42 and the second light absorbing regions 44, and the operations of the light ray direction control element 200 are described.

As with the second light transmitting regions 42 of Embodiment 1, the second light transmitting regions 42 of the present embodiment are regions that transmit visible light. The second light transmitting regions 42 of the present embodiment are provided on the first main surface 20a of the second light transmitting substrate 20.

Figure 19:
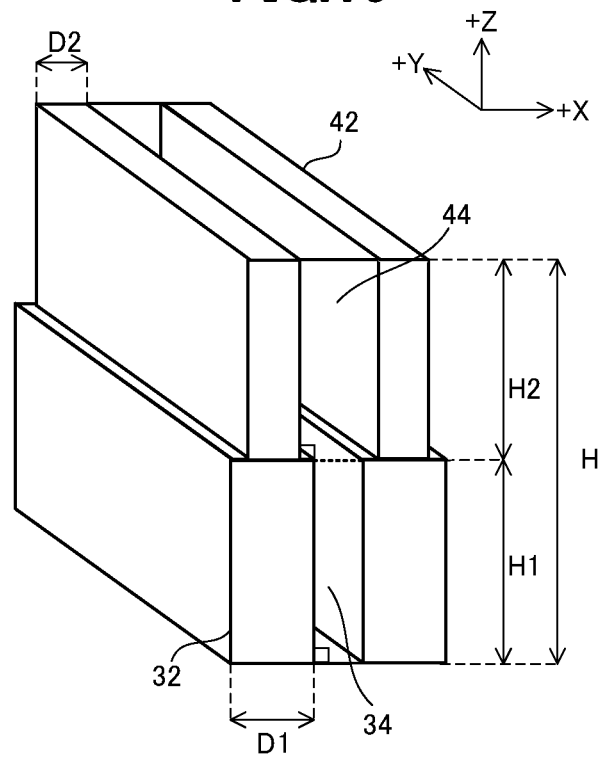
FIG. 19 is a perspective view illustrating first light transmitting regions, first light absorbing regions, second light transmitting regions, and second light absorbing regions according to Embodiment 4.
Figure 20:
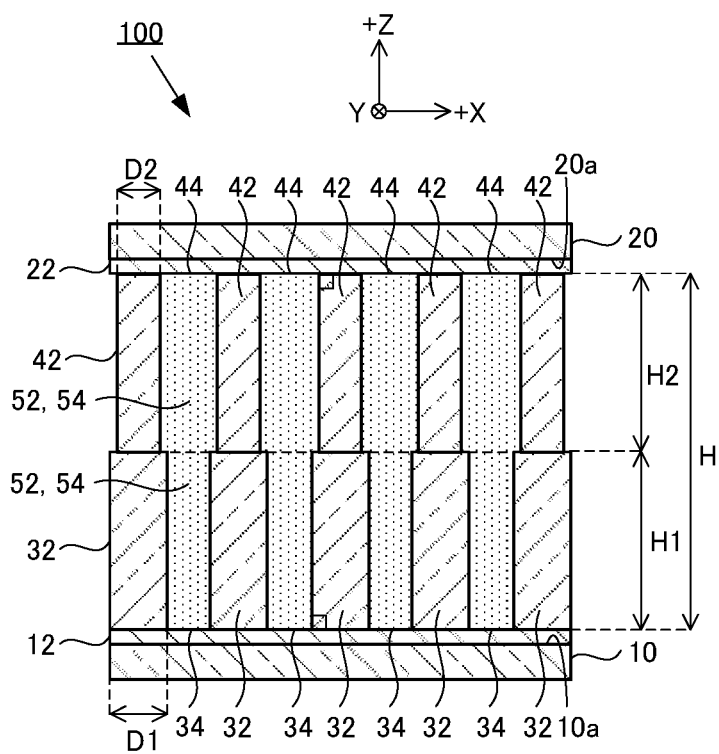
FIG. 20 is a cross-sectional view illustrating a light ray direction controller according to Embodiment 4.

As illustrated in FIGS. 19 and 20, the second light transmitting regions 42 of the present embodiment have a rectangular parallelepiped shape that extends in the Y direction, and are arranged at a predetermined spacing in the X direction. A width D2 in the X direction of the second light transmitting regions 42 of the present embodiment is narrower than the width D1 (the width D1 in the X direction of the first light transmitting regions 32 and the second light transmitting regions 42 of Embodiment 1) in the X direction of the first light transmitting regions 32 of the present embodiment (D2<D1). Accordingly, when viewing a cross-section on the XZ plane, the shape of the first light transmitting regions 32 and the shape of the second light transmitting regions 42 are different.

The second light transmitting regions 42 of the present embodiment extend from the second light transmitting substrate 20 toward the first light transmitting substrate 10, perpendicular to the first main surface 10a of the first light transmitting substrate 10, and are continuous with the first light transmitting regions 32. The other configurations of the second light transmitting regions 42 of the present embodiment are the same as those of the second light transmitting regions 42 of Embodiment 1.

As with the second light absorbing regions 44 of Embodiment 1, the second light absorbing regions 44 of the present embodiment are regions between adjacent second light transmitting regions 42. As with the second light transmitting regions 42, the second light absorbing regions 44 of the present embodiment extend from the second light transmitting substrate 20 toward the first light transmitting substrate 10, perpendicular to the first main surface 10a of the first light transmitting substrate 10. Additionally, the second light absorbing regions 44 of the present embodiment extend in the Y direction. In the present embodiment, the width D2 in the X direction of the second light transmitting regions 42 is narrower than the width D1 in the X direction of the first light transmitting regions 32 and, as such, the width in the X direction of the second light absorbing regions 44 of the present embodiment is wider than the width in the X direction of the first light absorbing regions 34. The other configurations of the second light absorbing regions 44 of the present embodiment are the same as those of the second light absorbing regions 44 of Embodiment 1.

Next, the operations of the light ray direction control element 200 of the present embodiment are described.

Third Perpendicular Narrow Field Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in Embodiment 1. In the following, this state is referred to as the "third perpendicular narrow field mode."

Figure 21:
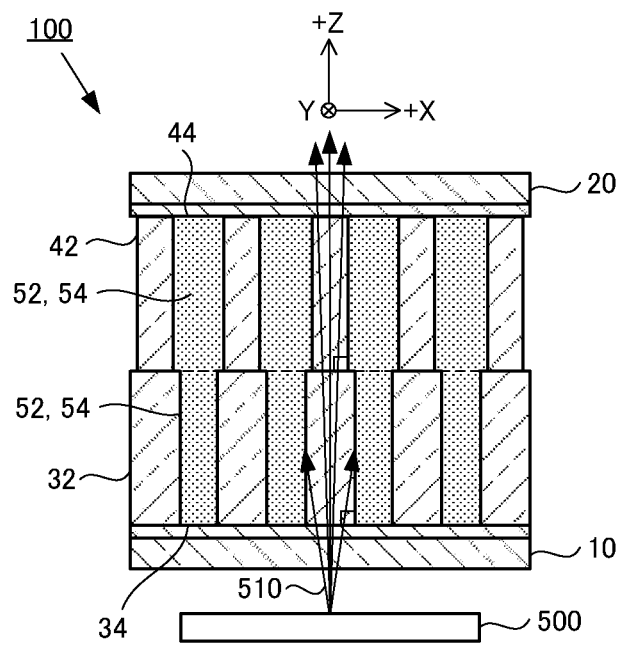
FIG. 21 is a schematic drawing illustrating a third perpendicular narrow field mode according to Embodiment 4.
Figure 22:
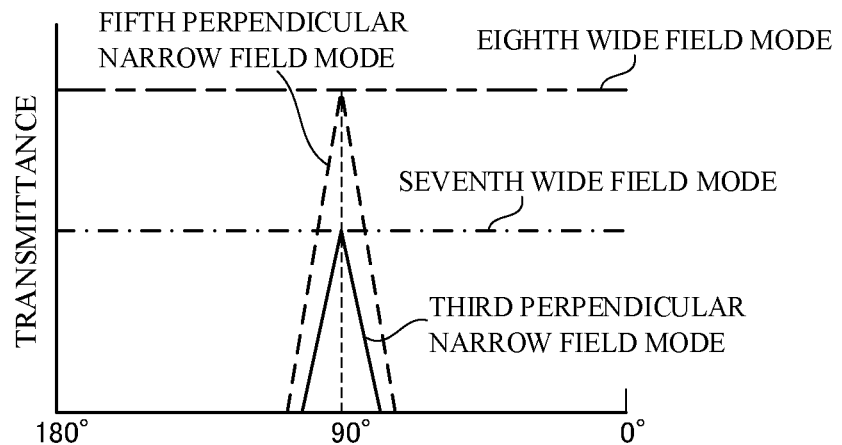
FIG. 22 is a drawing illustrating an angle distribution of emitted light of the light ray direction control element according to Embodiment 4, in a plane parallel to an XZ plane.

When viewing a cross-section on the XZ plane, the first light absorbing regions 34 and the second light absorbing regions 44 are perpendicular to the first main surface 10a of the first light transmitting substrate 10. As such, in the third perpendicular narrow field mode, of the light 510 that enters from the surface light source 500, the light other than that near the +Z direction is absorbed by the first light absorbing regions 34 and the second light absorbing regions 44 as illustrated in FIG. 21. Additionally, on the XZ plane, of the light 510 that enters from the surface light source 500, the light near the +Z direction exits from the light ray direction controller 100. Accordingly, in a plane parallel to the XZ plane, the emitted light of the light ray direction control element 200 in the third perpendicular narrow field mode has a narrow angle distribution near 90° (the +Z direction), as illustrated in FIG. 22. In the present embodiment, the width D2 in the X direction of the second light transmitting regions 42 is narrower than the width D1 in the X direction of the first light transmitting regions 32 and the second light transmitting regions 42 of Embodiment 1. As such, the angle distribution of the emitted light of the third perpendicular narrow field mode is narrower than the angle distribution of the emitted light of the first perpendicular narrow field mode of Embodiment 1, and the transmittance in the third perpendicular narrow field mode is lower than the transmittance in the first perpendicular narrow field mode.

Accordingly, in a plane parallel to the YZ plane that includes the first light transmitting regions 32 and the second light transmitting regions 42, the first light transmitting regions 32 and the second light transmitting regions 42 extend in the Y direction and, as such, the emitted light of the light ray direction control element 200 in the third perpendicular narrow field mode has a uniform angle distribution. In another plane parallel to the YZ plane, the first light absorbing regions 34 and the second light absorbing regions 44 extend in the Y direction and, as such, the light 510 that enters from the surface light source 500 is absorbed by the first light absorbing regions 34 and the second light absorbing regions 44.

As described above, the emitted light of the light ray direction control element 200 in the third perpendicular narrow field mode has a narrow angle distribution near 90° (the +Z direction) in a plane parallel to the XZ plane, and has a uniform angle distribution in a plane parallel to the YZ plane that includes the first light transmitting regions 32 and the second light transmitting regions 42. Accordingly, in the third perpendicular narrow field mode, the light ray direction control element 200 can limit the viewing angle in the left-right direction (the X direction) of the display device 300 to near the front surface (the +Z direction).

Fourth Perpendicular Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in Embodiment 1. In the following, this state is referred to as the "fourth perpendicular narrow field mode."

When viewing a cross-section on the XZ plane, the second light absorbing regions 44 and the second light transmitting regions 42 are perpendicular to the first main surface 10a of the first light transmitting substrate 10. As such, in the fourth perpendicular narrow field mode, of the light 510 that enters from the surface light source 500, the light other than that near the +Z direction is absorbed by the second light absorbing regions 44 as in the third perpendicular narrow field mode. Additionally, on the XZ plane, of the light 510 that enters from the surface light source 500, the light near the +Z direction exits from the light ray direction controller 100.

In a plane parallel to the YZ plane that includes the second light transmitting regions 42, the second light transmitting regions 42 extend in the Y direction and, as such, the emitted light of the light ray direction control element 200 in the fourth perpendicular narrow field mode has a uniform angle distribution. In another plane parallel to the YZ plane, the second light absorbing regions 44 extend in the Y direction and, as such, the light 510 that enters from the surface light source 500 is absorbed by the second light absorbing regions 44. Accordingly, in the fourth perpendicular narrow field mode, light having the same angle distribution as in the third perpendicular narrow field mode exits from the light ray direction control element 200.

As described above, in the fourth perpendicular narrow field mode, light having the same angle distribution as in the third perpendicular narrow field mode exits from the light ray direction control element 200. Accordingly, in the fourth perpendicular narrow field mode, the light ray direction control element 200 can limit the viewing angle in the left-right direction (the X direction) of the display device 300 to near the front surface (the +Z direction).

Fifth Perpendicular Narrow Field Mode

When the voltage controller 110 performs control such that the potential V1 of the first light transmitting electrode 12 is greater than the potential V2 of the second light transmitting electrode 22 (V1>V2), only the first light absorbing regions 34 function as light absorbing layers, as in Embodiment 1. In the following, this state is referred to as the "fifth perpendicular narrow field mode."

When viewing a cross-section on the XZ plane, the first light absorbing regions 34 and the first light transmitting regions 32 are perpendicular to the first main surface 10a of the first light transmitting substrate 10. As such, in the fifth perpendicular narrow field mode, of the light 510 that enters from the surface light source 500, the light other than that near the +Z direction is absorbed by the first light absorbing regions 34. Additionally, on the XZ plane, of the light 510 that enters from the surface light source 500, the light near the +Z direction exits from the light ray direction controller 100. Accordingly, in a plane parallel to the XZ plane, the emitted light of the light ray direction control element 200 in the fifth perpendicular narrow field mode has a narrow angle distribution near 90° (the +Z direction), as illustrated in FIG. 22.

In a plane parallel to the YZ plane that includes the first light transmitting regions 32, the first light transmitting regions 32 extend in the Y direction. Accordingly, in a plane parallel to the YZ plane that includes the first light transmitting regions 32, the emitted light of the light ray direction control element 200 in the fifth perpendicular narrow field mode has a uniform angle distribution. Meanwhile, in a plane parallel to the YZ plane that includes the first light absorbing regions 34, the first light absorbing regions 34 extend in the Y direction and, as such, in the fifth perpendicular narrow field mode, the light 510 that enters from the surface light source 500 is absorbed by the first light absorbing regions 34.

In the present embodiment, the width D1 in the X direction of the first light transmitting regions 32 is wider than the width D2 in the X direction of the second light transmitting regions 42 and, as such, the angle distribution of the emitted light of the fifth perpendicular narrow field mode is wider than the angle distribution of the emitted light of the third perpendicular narrow field mode and the fourth perpendicular narrow field mode. Additionally, the transmittance in the fifth perpendicular narrow field mode is higher than the transmittance in the third perpendicular narrow field mode and the fourth perpendicular narrow field mode.

As described above, the emitted light of the light ray direction control element 200 in the fifth perpendicular narrow field mode has a narrow angle distribution near 90° (the +Z direction) in a plane parallel to the XZ plane, and has a uniform angle distribution in a plane parallel to the YZ plane that includes the first light transmitting regions 32. Accordingly, in the fifth perpendicular narrow field mode, the light ray direction control element 200 can limit the viewing angle in the left-right direction (the X direction) of the display device 300 to near the front surface (the +Z direction).

Seventh Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the fourth perpendicular narrow field mode (V2>>V1), as in Embodiment 1, the electrophoretic particles 54 aggregate on the second light transmitting electrode 22 side of the second light absorbing regions 44, and the first light absorbing regions 34 and the second light absorbing regions 44 hardly function as light absorbing layers. In the following, this state is referred to as the "seventh wide field mode."

In the seventh wide field mode, the first light absorbing regions 34 and the second light absorbing regions 44 hardly function as light absorbing layers. Accordingly, in a plane parallel to the XZ plane, the emitted light of the light ray direction control element 200 in the seventh wide field mode has a uniform angle distribution as illustrated in FIG. 22. In the present embodiment, the width D2 in the X direction of the second light transmitting regions 42 is narrower than the width D1 in the X direction of the first light transmitting regions 32 and the second light transmitting regions 42 of Embodiment 1 and, as such, the transmittance in the seventh wide field mode is lower than the transmittance in the first wide field mode. Additionally, in a plane parallel to the YZ plane, the emitted light of the light ray direction control element 200 in the seventh wide field mode has a uniform angle distribution. In the seventh wide field mode, the light ray direction control element 200 does not limit the viewing angle of the display device 300.

Eighth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the fifth perpendicular narrow field mode (V1>>V2), as in Embodiment 1, the electrophoretic particles 54 aggregate on the first light transmitting electrode 12 side of the first light absorbing regions 34, and the first light absorbing regions 34 and the second light absorbing regions 44 hardly function as light absorbing layers. In the following, this state is referred to as the "eighth wide field mode."

In the eighth wide field mode, the first light absorbing regions 34 and the second light absorbing regions 44 hardly function as light absorbing layers. Accordingly, in a plane parallel to the XZ plane, the emitted light of the light ray direction control element 200 in the eighth wide field mode has a uniform angle distribution as illustrated in FIG. 22. Additionally, in a plane parallel to the YZ plane, the emitted light of the light ray direction control element 200 in the eighth wide field mode has a uniform angle distribution. In the eighth wide field mode, the light ray direction control element 200 does not limit the viewing angle of the display device 300.

In the present embodiment, the width D1 in the X direction of the first light transmitting regions 32 is wider than the width D2 in the X direction of the second light transmitting regions 42 and, as such, the transmittance in the eighth wide field mode is higher than the transmittance in the seventh wide field mode.

As described above, when viewing a cross-section on the XZ plane, the shape of the first light transmitting regions 32 differs from the shape of the second light transmitting regions 42 and, as such, the light ray direction control element 200 of the present embodiment can emit light in three or more types of angle distributions by controlling the potential V1 of the first light transmitting electrode 12 and the potential V2 of the second light transmitting electrode 22.

Embodiment 5

The second light transmitting regions 42 of Embodiment 4 are arranged in the X direction, but a configuration is possible in which the second light transmitting regions 42 are arranged in a matrix. With the light ray direction control element 200 of the present embodiment, the configurations of the second light transmitting regions 42 and the second light absorbing regions 44 differ from those of Embodiment 4. The other configurations of the light ray direction control element 200 of the present embodiment are the same as the configurations of the light ray direction control element 200 of Embodiment 4. Next, the configurations of the second light transmitting regions 42 and the second light absorbing regions 44 and the operations of the light ray direction control element 200 are described.

As with the second light transmitting regions 42 of Embodiment 4, the second light transmitting regions 42 of the present embodiment are regions that transmit visible light. The second light transmitting regions 42 of the present embodiment are provided on the first main surface 20a of the second light transmitting substrate 20.

Figure 23:
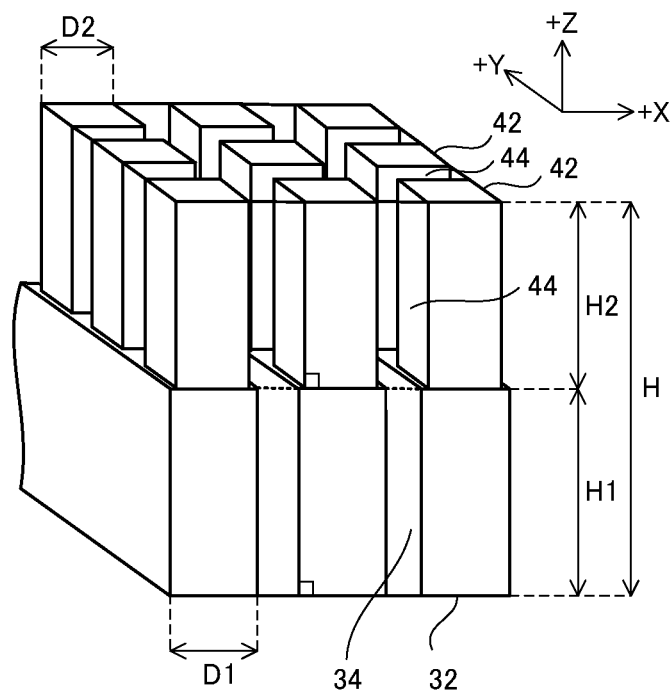
FIG. 23 is a perspective view illustrating first light transmitting regions, first light absorbing regions, second light transmitting regions, and second light absorbing regions according to Embodiment 5.

As illustrated in FIG. 23, the second light transmitting regions 42 of the present embodiment have a quadrangular prism shape and are arranged in a matrix in the X direction and the Y direction. The width D2 in the X direction of the second light transmitting regions 42 of the present embodiment is narrower than the width D1 (the width D1 in the X direction of the first light transmitting regions 32 and the second light transmitting regions 42 of Embodiment 1) in the X direction of the first light transmitting regions 32 of the present embodiment. The second light transmitting regions 42 of the present embodiment extend from the second light transmitting substrate 20 toward the first light transmitting substrate 10, perpendicular to the first main surface 10a of the first light transmitting substrate 10, and are continuous with the first light transmitting regions 32. In the present embodiment, as with the first light transmitting regions 32 of Embodiment 4, the first light transmitting regions 32 have a rectangular parallelepiped that extends in the Y direction and, as such, the second light transmitting regions 42 and the first light transmitting regions 32 have a configuration in which a plurality of the second light transmitting regions 42 is arranged in the Y direction (predetermined first direction) on one first light transmitting region 32. The other configurations of the second light transmitting regions 42 of the present embodiment are the same as the configurations of the second light transmitting regions 42 of Embodiment 4.

As with the second light absorbing regions 44 of Embodiment 4, the second light absorbing regions 44 of the present embodiment are regions between adjacent second light transmitting regions 42. In the present embodiment, the quadrangular prism shaped second light transmitting regions 42 are arranged in a matrix and, as such, the second light absorbing regions 44 form a lattice-shaped region. The second light absorbing regions 44 of the present embodiment are perpendicular to the first main surface 10a of the first light transmitting substrate 10. The other configurations of the second light absorbing regions 44 of the present embodiment are the same as the configurations of the second light absorbing regions 44 of Embodiment 4.

Next, the operations of the light ray direction control element 200 of the present embodiment are described.

Sixth Perpendicular Narrow Field Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in Embodiment 1. In the following, this state is referred to as the "sixth perpendicular narrow field mode."

When viewing a cross-section on a plane parallel to the XZ plane that includes the first light transmitting regions 32 and the second light transmitting regions 42, the first light absorbing regions 34 and the second light absorbing regions 44 are perpendicular to the first main surface 10a of the first light transmitting substrate 10. As such, in the sixth perpendicular narrow field mode, as in the third perpendicular narrow field mode (FIG. 21) of Embodiment 4, of the light 510 that enters from the surface light source 500, the light other than that near the +Z direction is absorbed by the first light absorbing regions 34 and the second light absorbing regions 44. Additionally, of the light 510 that enters from the surface light source 500, the light near the +Z direction exits from the light ray direction controller 100. Accordingly, in a plane parallel to the XZ plane that includes the first light transmitting regions 32 and the second light transmitting regions 42, the emitted light of the light ray direction control element 200 in the sixth perpendicular narrow field mode has a narrow angle distribution near 90° (the +Z direction), the same as in the third perpendicular narrow field mode. Meanwhile, when viewing a cross-section on a plane parallel to the XZ plane that includes the first light transmitting regions 32 and the second light absorbing regions 44, the second light absorbing regions 44 extend in the X direction and, as such, the light 510 that enters from the surface light source 500 is absorbed by the second light absorbing regions 44.

In the present embodiment, the width D2 in the X direction of the second light transmitting regions 42 is narrower than the width D1 in the X direction of the first light transmitting regions 32 and the second light transmitting regions 42 of Embodiment 1 and, as such, as in the third perpendicular narrow field mode, the angle distribution of the emitted light of the sixth perpendicular narrow field mode is narrower than the angle distribution of the emitted light of the first perpendicular narrow field mode of Embodiment 1. Additionally, the transmittance in the sixth perpendicular narrow field mode is lower than the transmittance in the first perpendicular narrow field mode.

Figure 24:
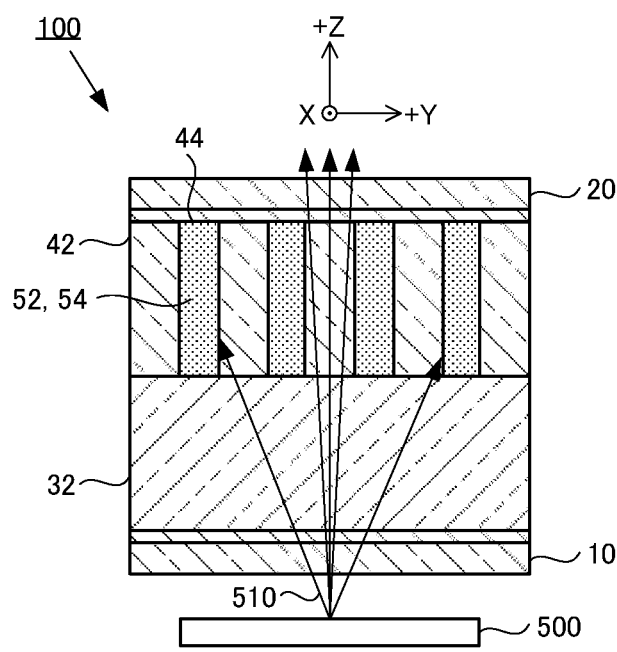
FIG. 24 is a schematic drawing illustrating a sixth perpendicular narrow field mode according to Embodiment 5.
Figure 25:
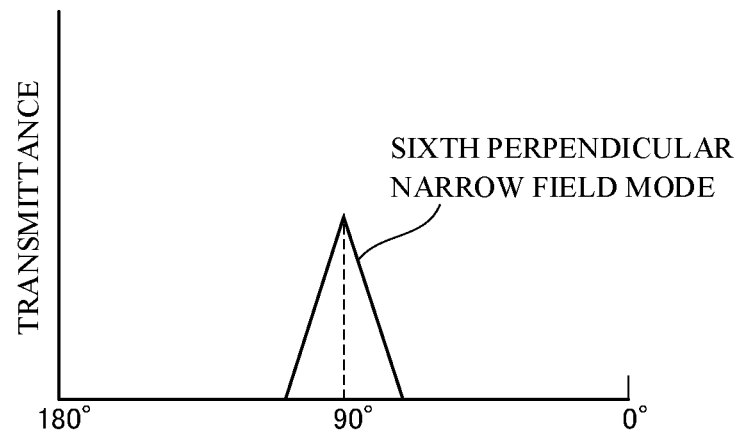
FIG. 25 is a drawing illustrating an angle distribution of emitted light of the light ray direction control element according to Embodiment 5, in a plane parallel to a YZ plane.

When viewing a cross-section on a plane parallel to the YZ plane that includes the first light transmitting regions 32 and the second light transmitting regions 42, the second light transmitting regions 42 have a quadrangular prism shape. As such, in the sixth perpendicular narrow field mode, the light 510 that enters from the surface light source 500 transmits through the first light transmitting regions 32, and of the light that transmits through the first light transmitting regions 32, the light other than that near the +Z direction is absorbed by the second light absorbing regions 44 as illustrated in FIG. 24. Additionally, of the light that transmits through the first light transmitting regions 32, the light near the +Z direction exits from the light ray direction controller 100. Accordingly, in a plane parallel to the YZ plane that includes the first light transmitting regions 32 and the second light transmitting regions 42, the emitted light of the light ray direction control element 200 in the sixth perpendicular narrow field mode has a narrow angle distribution near 90° (the +Z direction), as illustrated in FIG. 25. Meanwhile, when viewing a cross-section on a plane parallel to the YZ plane that includes the second light absorbing regions 44, the second light absorbing regions 44 extend in the Y direction and, as such, the light 510 that enters from the surface light source 500 is absorbed by the second light absorbing regions 44.

As described above, the emitted light of the light ray direction control element 200 in the sixth perpendicular narrow field mode has a narrow angle distribution near 90° (the +Z direction) in a plane parallel to the XZ plane that includes the first light transmitting regions 32 and the second light transmitting regions 42, and has a narrow angle distribution near 90° (the +Z direction) in a plane parallel to the YZ plane that includes the first light transmitting regions 32 and the second light transmitting regions 42. Accordingly, in the sixth perpendicular narrow field mode, the light ray direction control element 200 can limit the viewing angle of the display device 300 to near the front surface (the +Z direction).

Seventh Perpendicular Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in Embodiment 1. In the following, this state is referred to as the "seventh perpendicular narrow field mode."

When viewing a cross-section on a plane parallel to the XZ plane that includes the first light transmitting regions 32 and the second light transmitting regions 42, the second light absorbing regions 44 are perpendicular to the first main surface 10a of the first light transmitting substrate 10. As such, in the seventh perpendicular narrow field mode, of the light 510 that enters from the surface light source 500, the light other than that near the +Z direction is absorbed by the second light absorbing regions 44, as in the sixth perpendicular narrow field mode. Additionally, of the light 510 that enters from the surface light source 500, the light near the +Z direction exits from the light ray direction controller 100. Furthermore, in a plane parallel to the YZ plane that includes the first light transmitting regions 32 and the second light transmitting regions 42 as well, the light near the +Z direction exits from the light ray direction controller 100, as in the sixth perpendicular narrow field mode. Accordingly, in the seventh perpendicular narrow field mode, light having the same angle distribution as in the sixth perpendicular narrow field mode exits from the light ray direction control element 200.

As described above, in the seventh perpendicular narrow field mode, light having the same angle distribution as in the sixth perpendicular narrow field mode exits from the light ray direction control element 200. Accordingly, in the seventh perpendicular narrow field mode, the light ray direction control element 200 can limit the viewing angle of the display device 300 to near the front surface (the +Z direction), as in the sixth perpendicular narrow field mode.

Eighth Perpendicular Narrow Field Mode

When the voltage controller 110 performs control such that the potential V1 of the first light transmitting electrode 12 is greater than the potential V2 of the second light transmitting electrode 22 (V1>V2), only the first light absorbing regions 34 function as light absorbing layers, as in Embodiment 1. In the following, this state is referred to as the "eighth perpendicular narrow field mode."

The first light transmitting regions 32 and the first light absorbing regions 34 of the present embodiment respectively have the same shapes as the first light transmitting regions 32 and the first light absorbing regions 34 of Embodiment 4. Accordingly, in the eighth perpendicular narrow field mode, light having the same angle distribution as in the fifth perpendicular narrow field mode of Embodiment 4 exits from the light ray direction control element 200. Additionally, in the eighth perpendicular narrow field mode, the light ray direction control element 200 can limit the viewing angle in the left-right direction (the X direction) of the display device 300 to near the front surface (the +Z direction), as in the fifth perpendicular narrow field mode.

Ninth Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the seventh perpendicular narrow field mode (V2>>V1), as in Embodiment 1, the electrophoretic particles 54 aggregate on the second light transmitting electrode 22 side of the second light absorbing regions 44, and the first light absorbing regions 34 and the second light absorbing regions 44 hardly function as light absorbing layers. In the following, this state is referred to as the "ninth wide field mode."

In the ninth wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the ninth wide field mode has a uniform angle distribution. In the ninth wide field mode, the light ray direction control element 200 does not limit the viewing angle of the display device 300. In the present embodiment, the width D2 in the X direction of the second light transmitting regions 42 is narrower than the width D1 in the X direction of the first light transmitting regions 32 of Embodiment 1 and the second light absorbing regions 44 have a lattice shape and, as such, the transmittance in the ninth wide field mode is lower than the transmittance in the first wide field mode.

Tenth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the eighth perpendicular narrow field mode (V1>>V2), as in Embodiment 1, the electrophoretic particles 54 aggregate on the first light transmitting electrode 12 side of the first light absorbing regions 34, and the first light absorbing regions 34 and the second light absorbing regions 44 hardly function as light absorbing layers. In the following, this state is referred to as the "tenth wide field mode."

In the tenth wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the tenth wide field mode has a uniform angle distribution. In the tenth wide field mode, the light ray direction control element 200 does not limit the viewing angle of the display device 300. In the present embodiment, the width D1 in the X direction of the first light transmitting regions 32 is wider than the width D2 in the X direction of the second light transmitting regions 42 and, as such, the transmittance in the tenth wide field mode is higher than the transmittance in the ninth wide field mode.

Thus, as with the light ray direction control element 200 of Embodiment 4, the light ray direction control element 200 of the present embodiment can emit light in three or more types of angle distributions by controlling the potential V1 of the first light transmitting electrode 12 and the potential V2 of the second light transmitting electrode 22.

Embodiment 6

In Embodiment 4, the first light transmitting regions 32 and the second light transmitting regions 42 have rectangular parallelepiped shapes that extend in the Y direction, but a configuration is possible in which the first light transmitting regions 32 and the second light transmitting regions 42 have rectangular parallelepiped shapes that extend in different directions. With the light ray direction control element 200 of the present embodiment, the configurations of the second light transmitting regions 42 and the second light absorbing regions 44 differ from those of Embodiment 4. The other configurations of the light ray direction control element 200 of the present embodiment are the same as the configurations of the light ray direction control element 200 of Embodiment 4. Next, the configurations of the second light transmitting regions 42 and the second light absorbing regions 44, and the operations of the light ray direction control element 200 are described.

Figure 26:
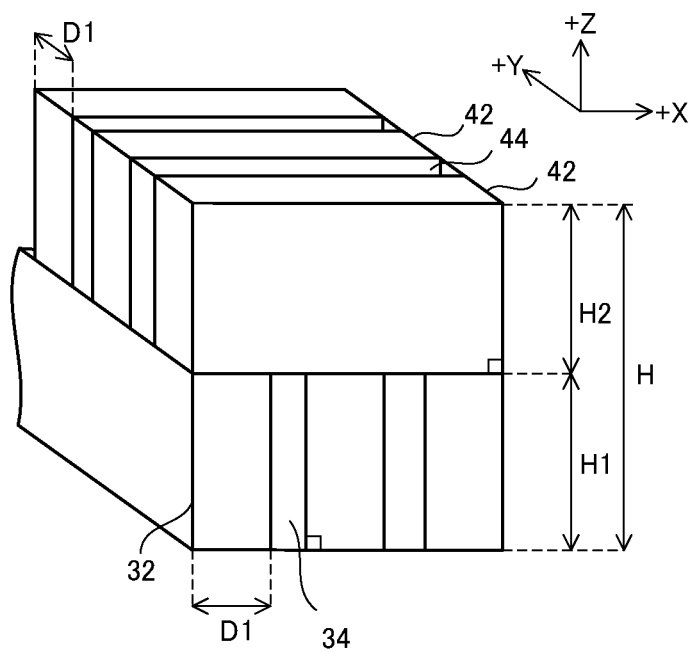
FIG. 26 is a perspective view illustrating first light transmitting regions, first light absorbing regions, second light transmitting regions, and second light absorbing regions according to Embodiment 6.

As with the second light transmitting regions 42 of Embodiment 4, the second light transmitting regions 42 of the present embodiment are regions that transmit visible light. the second light transmitting regions 42 of the present embodiment are provided on the first main surface 20a of the second light transmitting substrate 20. As illustrated in FIG. 26, the second light transmitting regions 42 of the present embodiment have a rectangular parallelepiped shape that extends in the X direction, and are arranged at a predetermined spacing in Y direction. Accordingly, when viewing a cross-section on the XZ plane, the shape of the first light transmitting regions 32 and the shape of the second light transmitting regions 42 are different.

The second light transmitting regions 42 of the present embodiment extend from the second light transmitting substrate 20 toward the first light transmitting substrate 10, perpendicular to the first main surface 10a of the first light transmitting substrate 10, and are continuous with the first light transmitting regions 32. The other configurations of the second light transmitting regions 42 of the present embodiment are the same as those of the second light transmitting regions 42 of Embodiment 4.

As with the second light absorbing regions 44 of Embodiment 4, the second light absorbing regions 44 of the present embodiment are regions between adjacent second light transmitting regions 42. In the present embodiment, the second light absorbing regions 44 extend in the X direction, the same as the second light transmitting regions 42. Additionally, as with the second light transmitting regions 42, the second light absorbing regions 44 extend, from the second light transmitting substrate 20 toward the first light transmitting substrate 10, perpendicular to the first main surface 10a of the first light transmitting substrate 10. The other configurations of the second light absorbing regions 44 of the present embodiment are the same as those of the second light absorbing regions 44 of Embodiment 4.

Next, the operations of the light ray direction control element 200 of the present embodiment are described.

Ninth Perpendicular Narrow Field Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in Embodiment 1. In the following, this state is referred to as the "ninth perpendicular narrow field mode."

Figure 27:
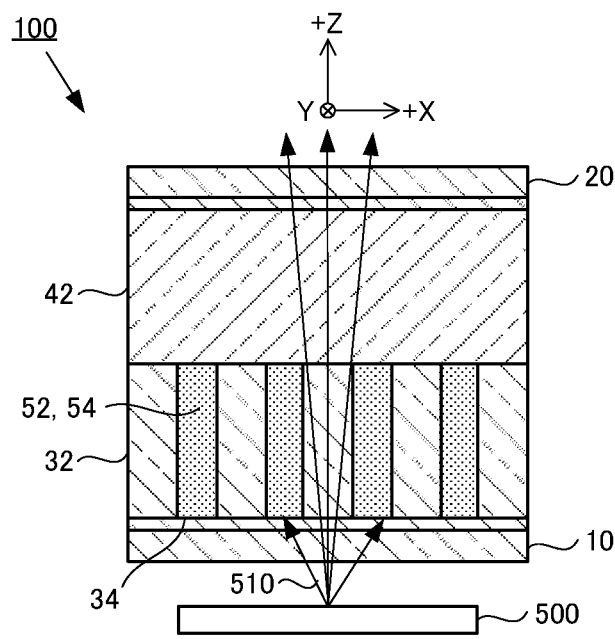
FIG. 27 is a schematic drawing illustrating a ninth perpendicular narrow field mode according to Embodiment 6.
Figure 28:
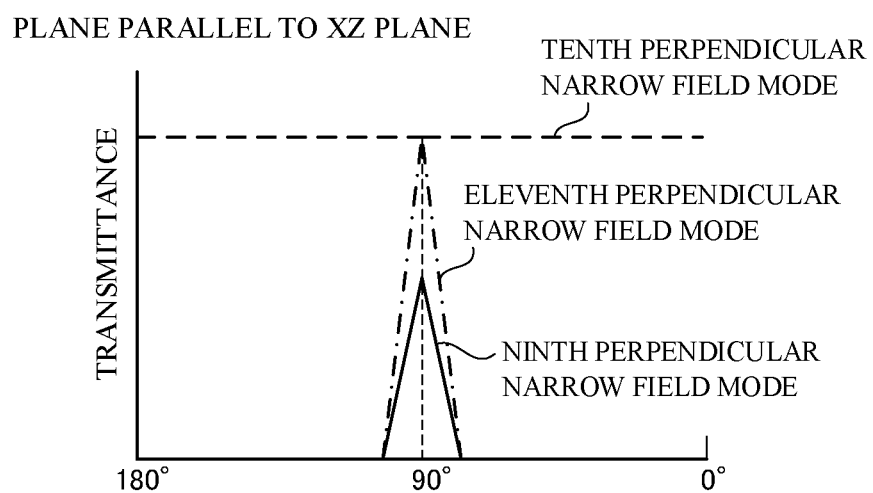
FIG. 28 is a drawing illustrating an angle distribution of emitted light of the light ray direction control element according to Embodiment 6, in a plane parallel to an XZ plane.

When viewing a cross-section on a plane parallel to the XZ plane that includes the first light transmitting regions 32 and the second light transmitting regions 42, the first light absorbing regions 34 are perpendicular to the first main surface 10a of the first light transmitting substrate 10. As such, in the ninth perpendicular narrow field mode, of the light 510 that enters from the surface light source 500, the light other than that near the +Z direction is absorbed by the first light absorbing regions 34, as illustrated in FIG. 27. Additionally, of the light 510 that enters transmits the surface light source 500, the light near the +Z direction transmits through the first light transmitting regions 32. The light that transmits through the first light transmitting regions 32 transmits through the second light transmitting regions 42 and exits from the light ray direction controller 100. Accordingly, in a plane parallel to the XZ plane that includes the first light transmitting regions 32 and the second light transmitting regions 42, the emitted light of the light ray direction control element 200 in the ninth perpendicular narrow field mode has a narrow angle distribution near 90° (the +Z direction), as illustrated in FIG. 28. Meanwhile, when viewing a cross-section on a plane parallel to the XZ plane that includes the first light transmitting regions 32 and the second light absorbing regions 44, in the ninth perpendicular narrow field mode, the second light absorbing regions 44 extend in the X direction and, as such, the light 510 that enters from the surface light source 500 is absorbed by the second light absorbing regions 44.

In the present embodiment, the second light absorbing regions 44 that extend in the X direction absorb a portion of the light that transmits through the first light absorbing regions 34 and, as such, the transmittance in the ninth perpendicular narrow field mode is low.

Figure 29:
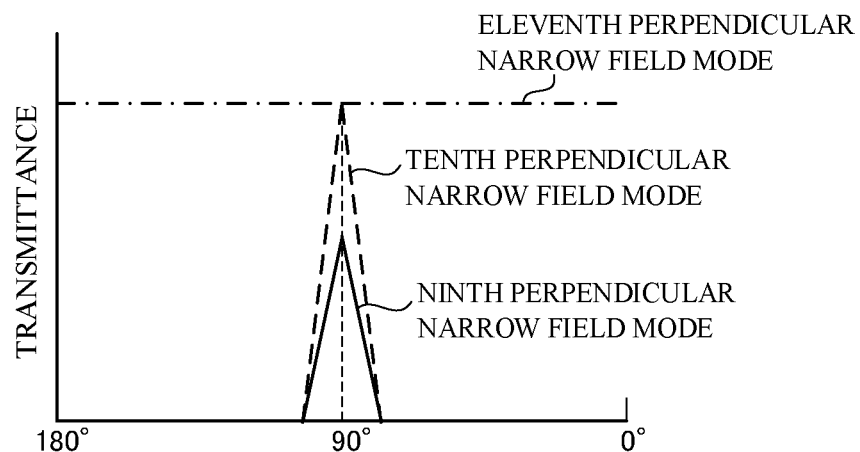
FIG. 29 is a drawing illustrating an angle distribution of emitted light of the light ray direction control element according to Embodiment 6, in a plane parallel to a YZ plane.

When viewing a cross-section on a plane parallel to the YZ plane that includes the first light transmitting regions 32 and the second light transmitting regions 42, as with the sixth perpendicular narrow field mode (FIG. 24) of Embodiment 5, in the ninth perpendicular narrow field mode, the light 510 that enters from the surface light source 500 transmits through the first light transmitting regions 32 and, of the light that transmits through the first light transmitting regions 32, the light other than that near the +Z direction is absorbed by the second light absorbing regions 44. Of the light that transmits through the first light transmitting regions 32, the light near the +Z direction exits from the light ray direction controller 100. Accordingly, in a plane parallel to the YZ plane that includes the first light transmitting regions 32 and the second light transmitting regions 42, the emitted light of the light ray direction control element 200 in the ninth perpendicular narrow field mode has a narrow angle distribution near 90° (the +Z direction), as illustrated in FIG. 29. Meanwhile, when viewing a cross-section on a plane parallel to the YZ plane that includes the first light absorbing regions 34 and the second light transmitting regions 42, in the ninth perpendicular narrow field mode, the first light absorbing regions 34 extend in the Y direction and, as such, the light 510 that enters from the surface light source 500 is absorbed by the first light absorbing regions 34.

As described above, the emitted light of the light ray direction control element 200 in the ninth perpendicular narrow field mode has a narrow angle distribution near 90° (the +Z direction) in a plane parallel to the XZ plane that includes the first light transmitting regions 32 and the second light transmitting regions 42, and has a narrow angle distribution near 90° (the +Z direction) in a plane parallel to the YZ plane that includes the first light transmitting regions 32 and the second light transmitting regions 42. Accordingly, in the ninth perpendicular narrow field mode, the light ray direction control element 200 can limit the viewing angle of the display device 300 to near the front surface (the +Z direction).

Tenth Perpendicular Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in Embodiment 1. In the following, this state is referred to as the "tenth perpendicular narrow field mode."

Figure 30:
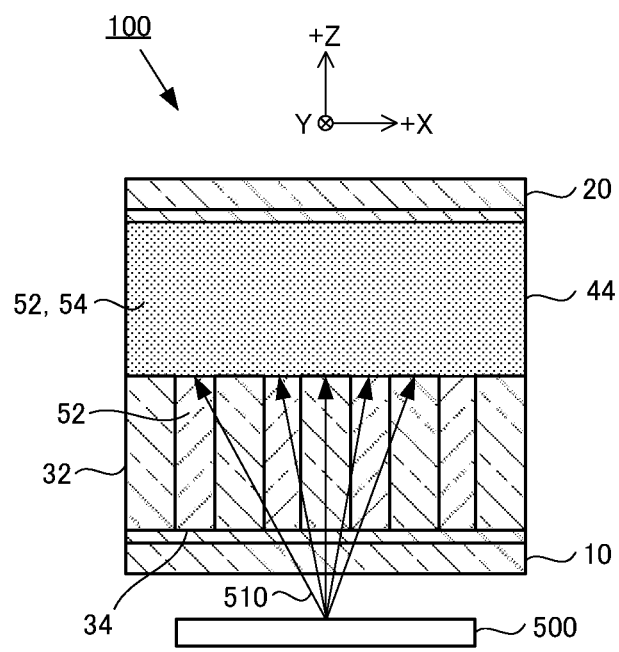
FIG. 30 is a schematic drawing illustrating a tenth perpendicular narrow field mode according to Embodiment 6.
Figure 31:
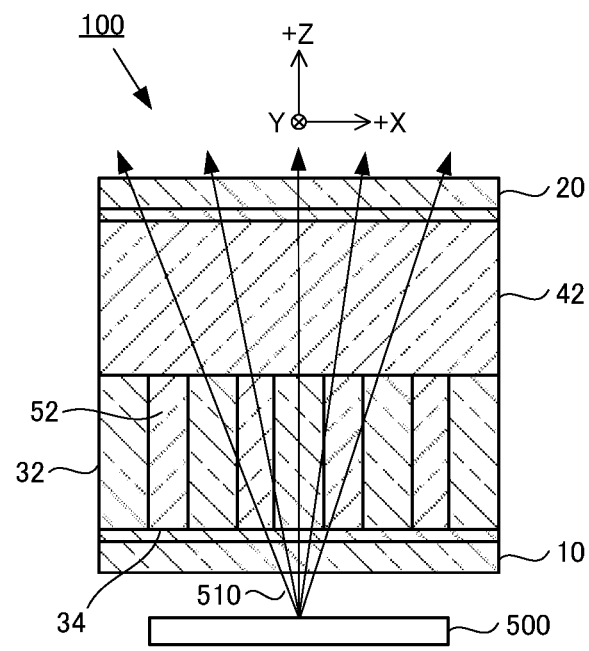
FIG. 31 is a schematic drawing illustrating the tenth perpendicular narrow field mode according to Embodiment 6.

When viewing a cross-section on a plane parallel to the XZ plane that includes the second light absorbing regions 44, as illustrated in FIG. 30, in the tenth perpendicular narrow field mode, the light 510 that enters from the surface light source 500 transmits through the first light transmitting regions 32 and the first light absorbing regions 34 and, then, is absorbed by the second light absorbing regions 44 that extend in the X direction. Meanwhile, when viewing a cross-section on a plane parallel to the XZ plane that includes the second light transmitting regions 42, as illustrated in FIG. 31, the light 510 that enters from the surface light source 500 transmits through the first light transmitting regions 32 and the first light absorbing regions 34 and, then, transmits through the second light transmitting regions 42. Accordingly, in a plane parallel to the XZ plane that includes the second light transmitting regions 42, the emitted light of the light ray direction control element 200 in the tenth perpendicular narrow field mode has a uniform angle distribution, as illustrated in FIG. 28.

When viewing a cross-section on the YZ plane, in the tenth perpendicular narrow field mode, the light 510 that enters from the surface light source 500 transmits through the first light transmitting regions 32 and the first light absorbing regions 34. Of the light that transmits through the first light transmitting regions 32 and the first light absorbing regions 34, the light other than that near the +Z direction is absorbed by the second light absorbing regions 44. Of the light that transmits through the first light transmitting regions 32 and the first light absorbing regions 34, the light near the +Z direction exits from the light ray direction controller 100. Accordingly, in a plane parallel to the YZ plane, the emitted light of the light ray direction control element 200 in the tenth perpendicular narrow field mode has a narrow angle distribution near 90° (the +Z direction), as illustrated in FIG. 29.

Since the light 510 that enters from the surface light source 500 is not absorbed by the first light absorbing regions 34, the transmittance in the tenth perpendicular narrow field mode is higher than the transmittance in the ninth perpendicular narrow field mode.

As described above, the emitted light of the light ray direction control element 200 in the tenth perpendicular narrow field mode has a uniform angle distribution in a plane parallel to the XZ plane that includes the second light transmitting regions 42, and has a narrow angle distribution near 90° (the +Z direction) in a plane parallel to the YZ plane. Accordingly, in the tenth perpendicular narrow field mode, the light ray direction control element 200 can limit the viewing angle in the vertical direction (the Y direction) of the display device 300 to near the front surface (the +Z direction).

Eleventh Perpendicular Narrow Field Mode

When the voltage controller 110 performs control such that the potential V1 of the first light transmitting electrode 12 is greater than the potential V2 of the second light transmitting electrode 22 (V1>V2), only the first light absorbing regions 34 function as light absorbing layers, as in Embodiment 1. In the following, this state is referred to as the "eleventh perpendicular narrow field mode."

The first light transmitting regions 32 and the first light absorbing regions 34 of the present embodiment respectively have the same shapes as the first light transmitting regions 32 and the first light absorbing regions 34 of Embodiment 4. When viewing a cross-section on the XZ plane, in the eleventh perpendicular narrow field mode, of the light 510 that enters from the surface light source 500, the light other than that near the +Z direction is absorbed by the second light absorbing regions 44, as in the fifth perpendicular narrow field mode of Embodiment 4. Additionally, of the light 510 that enters from the surface light source 500, the light near the +Z direction exits from the light ray direction controller 100. Accordingly, in a plane parallel to the XZ plane, the emitted light of the light ray direction control element 200 in the eleventh perpendicular narrow field mode has the same narrow angle distribution near 90° (the +Z direction) as in the fifth perpendicular narrow field mode, as illustrated in FIG. 28. Additionally in a plane parallel to the YZ plane, the emitted light of the light ray direction control element 200 in the eleventh perpendicular narrow field mode has the same uniform angle distribution as in the fifth perpendicular narrow field mode, as illustrated in FIG. 29.

Since the light 510 that enters from the surface light source 500 is not absorbed by the second light absorbing regions 44, the transmittance in the eleventh perpendicular narrow field mode is higher than the transmittance in the ninth perpendicular narrow field mode.

As described above, the emitted light of the light ray direction control element 200 in the eleventh perpendicular narrow field mode has a narrow angle distribution near 90° (the +Z direction) in a plane parallel to the XZ plane, and has a uniform angle distribution in a plane parallel to the YZ plane. Accordingly, in the eleventh perpendicular narrow field mode, the light ray direction control element 200 can limit the viewing angle in the left-right direction (the X direction) of the display device 300 to near the front surface (the +Z direction).

Eleventh Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the tenth perpendicular narrow field mode (V2>>V1), as in Embodiment 1, the first light absorbing regions 34 and the second light absorbing regions 44 hardly function as light absorbing layers. In the following, this state is referred to as the "eleventh wide field mode."

In the eleventh wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the eleventh wide field mode has a uniform angle distribution. In the eleventh wide field mode, the light ray direction control element 200 does not limit the viewing angle of the display device 300.

Twelfth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the eleventh perpendicular narrow field mode (V1>>V2), as in Embodiment 1, the first light absorbing regions 34 and the second light absorbing regions 44 hardly function as light absorbing layers. In the following, this state is referred to as the "twelfth wide field mode."

In the twelfth wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the twelfth wide field mode has a uniform angle distribution. In the twelfth wide field mode, the light ray direction control element 200 does not limit the viewing angle of the display device 300.

Thus, as with the light ray direction control element 200 of Embodiment 4, the light ray direction control element 200 of the present embodiment can emit light in three or more angle distributions by controlling the potential V1 of the first light transmitting electrode 12 and the potential V2 of the second light transmitting electrode 22.

Embodiment 7

In Embodiment 4, the rectangular parallelepiped first light transmitting regions 32 are arranged in the X direction, and the first light absorbing regions 34 are disposed between adjacent first light transmitting regions 32, but a configuration is possible in which the first light transmitting regions 32 have a lattice shape, and the first light absorbing regions 34 are provided in the openings of the lattice. In the light ray direction control element 200 of the present embodiment, the configurations of the first light transmitting regions 32, the first light absorbing regions 34, the second light transmitting regions 42, and the second light absorbing regions 44 differ from those in the other embodiments. The other configurations of the light ray direction control element 200 of the present embodiment are the same as the configurations of the light ray direction control element 200 of the other embodiments. Next, the configurations of the first light transmitting regions 32, the first light absorbing regions 34, the second light transmitting regions 42, and the second light absorbing regions 44, and the operations of the light ray direction control element 200 are described.

Figure 32:
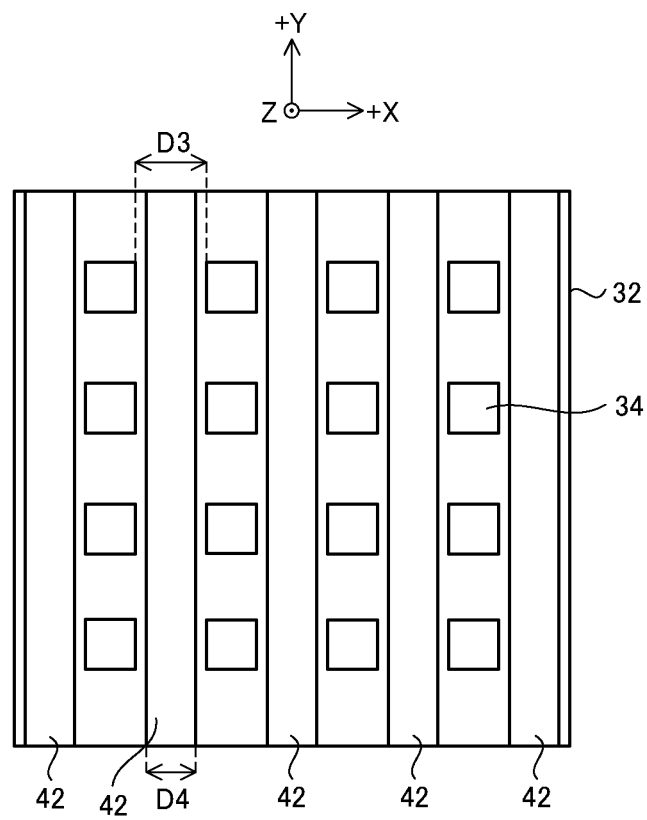
FIG. 32 is a plan view illustrating first light transmitting regions, first light absorbing regions, and second light transmitting regions according to Embodiment 7.

As in the other embodiments, the first light transmitting regions 32 of the present embodiment are regions that transmit visible light. The first light transmitting regions 32 of the present embodiment are provided on the first main surface 10a of the first light transmitting substrate 10. As illustrated in FIG. 32, the first light transmitting regions 32 of the present embodiment have a lattice shape. The other configurations of the first light transmitting regions 32 of the present embodiment are the same as in the other embodiments.

The first light absorbing regions 34 of the present embodiment are regions in the openings of the lattice of the first light transmitting regions 32, and are positioned between the first light transmitting regions 32. Accordingly, the first light absorbing regions 34 of the present embodiment have a quadrangular prism shape and are disposed in a matrix in the X direction and the Y direction. The other configurations of the first light absorbing regions 34 of the present embodiment are the same as in the other embodiments.

Figure 33:
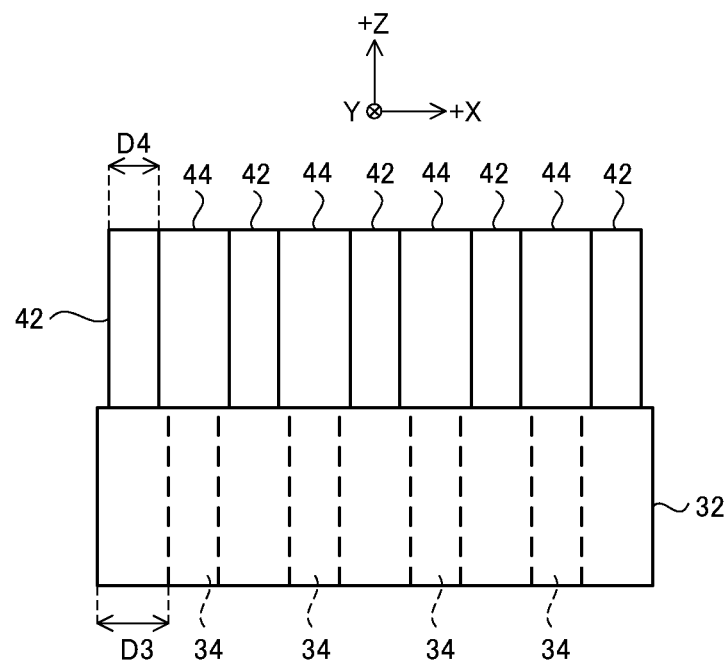
FIG. 33 is a side view illustrating the first light transmitting regions, the first light absorbing regions, the second light transmitting regions, and second light absorbing regions according to Embodiment 7.

As in the other embodiments, the second light transmitting regions 42 of the present embodiment are regions that transmit visible light, and are provided on the first main surface 20a of the second light transmitting substrate 20. As illustrated in FIGS. 32 and 33, the second light transmitting regions 42 of the present embodiment have a rectangular parallelepiped shape that extends in the Y direction (predetermined second direction), and are arranged in the X direction. When viewed from above, the second light transmitting regions 42 of the present embodiment are positioned on a lattice that extends in the Y direction of the first light transmitting regions 32, and are connected to the first light transmitting regions 32. A width D4 in the X direction of the second light transmitting regions 42 of the present embodiment is narrower than a width D3 in the X direction of the lattice of the first light transmitting regions 32. Accordingly, when viewing a cross-section on the XZ plane, the shape of the first light transmitting regions 32 and the shape of the second light transmitting regions 42 are different. The other configurations of the second light transmitting regions 42 of the present embodiment are the same as in the other embodiments.

As in the other embodiments, the second light absorbing regions 44 of the present embodiment are regions between adjacent second light transmitting regions 42. The second light absorbing regions 44 of the present embodiment extend in the Y direction. The other configurations of the second light absorbing regions 44 of the present embodiment are the same as in the other embodiments.

Next, the operations of the light ray direction control element 200 of the present embodiment are described.

Twelfth Perpendicular Narrow Field Mode

When the voltage controller 110 performs control such that the potential V1 of the first light transmitting electrode 12 and the potential V2 of the second light transmitting electrode 22 are equal (V1=V2), the first light absorbing regions 34 and the second light absorbing regions 44 function as light absorbing layers, as in the other embodiments. In the following, this state is referred to as the "twelfth perpendicular narrow field mode."

Figure 34:
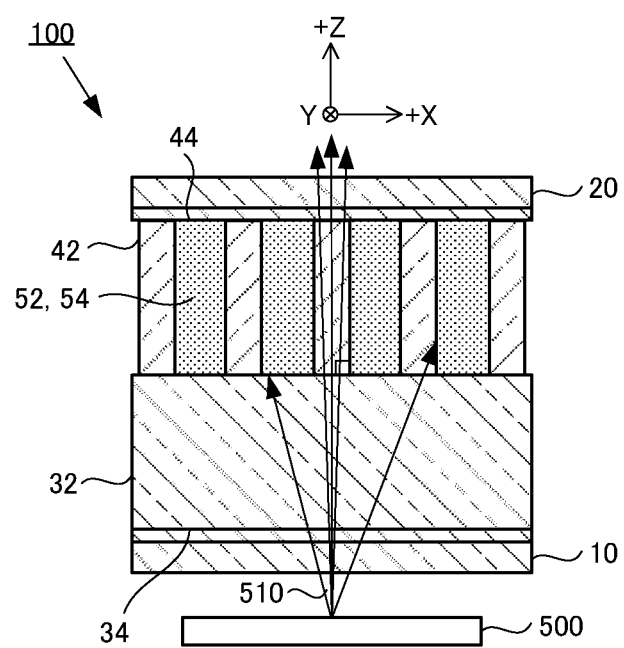
FIG. 34 is a schematic drawing illustrating a twelfth perpendicular narrow field mode according to Embodiment 7.
Figure 35:
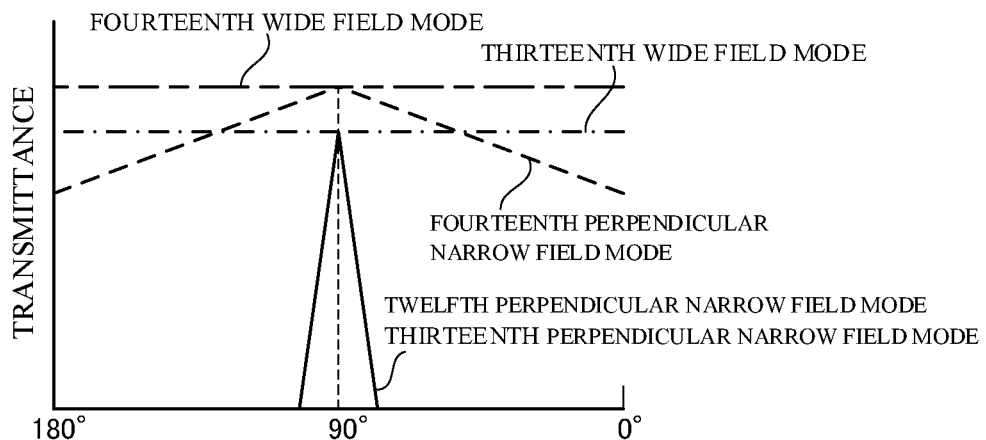
FIG. 35 is a drawing illustrating an angle distribution of emitted light of the light ray direction control element according to Embodiment 7, in a plane parallel to an XZ plane.

When viewing a cross-section on a plane parallel to the XZ plane that includes a lattice portion of the first light transmitting regions 32, in the twelfth perpendicular narrow field mode, the light 510 that enters from the surface light source 500 transmits through the first light transmitting regions 32, as illustrated in FIG. 34. Of the light that transmits through the first light transmitting regions 32, the light other than that near the +Z direction is absorbed by the second light absorbing regions 44, and the light near the +Z direction exits from the light ray direction controller 100. When viewing a cross-section on a plane parallel to the XZ including the first light absorbing regions 34, in the twelfth perpendicular narrow field mode, of the light 510 that enters from the surface light source 500, the light near the +Z direction exits from the light ray direction controller 100, as in the third perpendicular narrow field mode (FIG. 21) of Embodiment 4. Accordingly, in a plane parallel to the XZ plane, the emitted light of the light ray direction control element 200 in the twelfth perpendicular narrow field mode has a narrow angle distribution near 90° (the +Z direction), as illustrated in FIG. 35.

Figure 36:
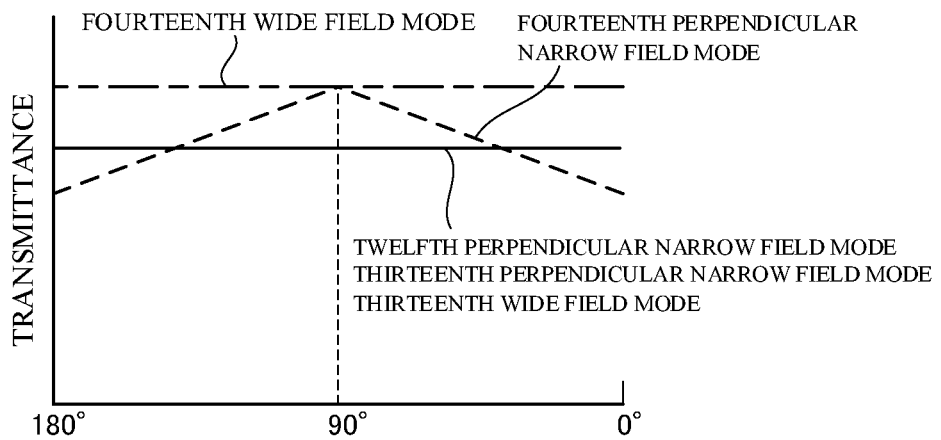
FIG. 36 is a drawing illustrating an angle distribution of emitted light of the light ray direction control element according to Embodiment 7, in a plane parallel to a YZ plane.

When viewing a cross-section on a plane parallel to the YZ plane that includes the lattice portion of the first light transmitting regions 32 and the second light transmitting regions 42, the second light transmitting regions 42 that extend in the Y direction are positioned on the lattice that extends in the Y direction of the first light transmitting regions 32. Accordingly, in a plane parallel to the YZ plane that includes the lattice portion of the first light transmitting regions 32 and the second light transmitting regions 42, the emitted light of the light ray direction control element 200 in the twelfth perpendicular narrow field mode has a uniform angle distribution, as illustrated in FIG. 36. Meanwhile, when viewing a cross-section on a plane parallel to the YZ plane that includes the second light absorbing regions 44, the second light absorbing regions 44 extend in the Y direction and, as such, the light 510 that enters from the surface light source 500 is absorbed by the second light absorbing regions 44.

As described above, the emitted light of the light ray direction control element 200 in the twelfth perpendicular narrow field mode has a narrow angle distribution near 90° (the +Z direction) in a plane parallel to the XZ plane, and has a uniform angle distribution in a plane parallel to the YZ plane that includes the lattice portion of the first light transmitting regions 32 and the second light transmitting regions 42. Accordingly, in the twelfth perpendicular narrow field mode, the light ray direction control element 200 can limit the viewing angle in the left-right direction (the X direction) of the display device 300 to near the front surface (the +Z direction).

Thirteenth Perpendicular Narrow Field Mode

When the voltage controller 110 performs control such that the potential V2 of the second light transmitting electrode 22 is greater than the potential V1 of the first light transmitting electrode 12 (V2>V1), only the second light absorbing regions 44 function as light absorbing layers, as in the other embodiments. In the following, this state is referred to as the "thirteenth perpendicular narrow field mode."

When viewing a cross-section on the XZ plane, in the thirteenth perpendicular narrow field mode, the light 510 that enters from the surface light source 500 transmits through the first light transmitting regions 32 and the first light absorbing regions 34, and of the light that transmits through the first light transmitting regions 32 and the first light absorbing regions 34, the light other than that near the +Z direction is absorbed by the second light absorbing regions 44. Additionally, of the light that transmits through the first light transmitting regions 32 and the first light absorbing regions 34, the light near the +Z direction exits from the light ray direction controller 100. Accordingly, in a plane parallel to the XZ plane, the emitted light of the light ray direction control element 200 in the thirteenth perpendicular narrow field mode has a narrow angle distribution near 90° (the +Z direction), as illustrated in FIG. 35.

In a plane parallel to the YZ plane, the emitted light of the light ray direction control element 200 in the thirteenth perpendicular narrow field mode has a uniform angle distribution, as in the twelfth perpendicular narrow field mode.

As described above, the emitted light of the light ray direction control element 200 in the thirteenth perpendicular narrow field mode has a narrow angle distribution near 90° (the +Z direction) in a plane parallel to the XZ plane, and has a uniform angle distribution in a plane parallel to the YZ plane that includes the lattice portion of the first light transmitting regions 32 and the second light transmitting regions 42. Accordingly, in the thirteenth perpendicular narrow field mode, the light ray direction control element 200 can limit the viewing angle in the left-right direction (the X direction) of the display device 300 to near the front surface (the +Z direction).

Fourteenth Perpendicular Narrow Field Mode

When the voltage controller 110 performs control such that the potential V1 of the first light transmitting electrode 12 is greater than the potential V2 of the second light transmitting electrode 22 (V1>V2), only the first light absorbing regions 34 function as light absorbing layers, as in the other embodiments. In the following, this state is referred to as the "fourteenth perpendicular narrow field mode."

When viewing a cross-section on a plane parallel to the XZ plane that does not include the first light absorbing regions 34, in the fourteenth perpendicular narrow field mode, the light 510 that enters from the surface light source 500 exits from the light ray direction control element 200 without being absorbed by the first light absorbing regions 34 and the second light absorbing regions 44. In a plane parallel to the XZ plane that does not include the first light absorbing regions 34, the emitted light of the light ray direction control element 200 in the fourteenth perpendicular narrow field mode has a uniform angle distribution.

Figure 37:
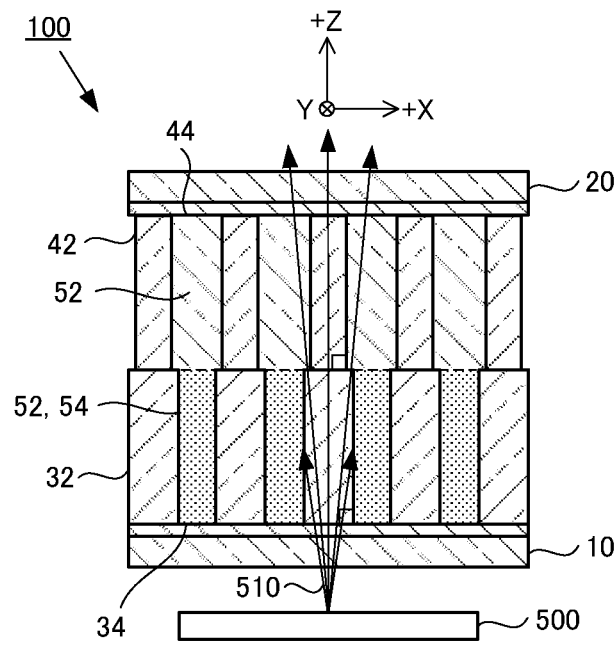
FIG. 37 is a schematic drawing illustrating a fourteenth perpendicular narrow field mode according to Embodiment 7.

Additionally, when viewing a cross-section on a plane parallel to the XZ plane that includes the first light absorbing regions 34, as illustrated in FIG. 37, of the light 510 that enters from the surface light source 500, the light other than that near the +Z direction is absorbed by the second light absorbing regions 44, and the light near the +Z direction exits from the light ray direction controller 100. In a plane parallel to the XZ plane that includes the first light absorbing regions 34, the emitted light of the light ray direction control element 200 in the fourteenth perpendicular narrow field mode has a narrow angle distribution near 90° (the +Z direction).

Accordingly, in terms of the entire light ray direction controller 100, the emitted light of the light ray direction control element 200 in the fourteenth perpendicular narrow field mode has an angle distribution in which, as illustrated in FIG. 35, in a plane parallel to the XZ plane, the transmittance gradually decreases toward 0° and 180°, with 90° as the maximum.

The first light absorbing regions 34 have a quadrangular prism shape and are disposed in a matrix in the X direction and the Y direction and, as such, in a plane parallel to the YZ plane that does not include the first light absorbing regions 34, the emitted light of the light ray direction control element 200 in the fourteenth perpendicular narrow field mode has a uniform angle distribution. Additionally, in a plane parallel to the YZ plane that includes the first light absorbing regions 34, the emitted light of the light ray direction control element 200 in the fourteenth perpendicular narrow field mode has a narrow angle distribution near 90° (the +Z direction). Accordingly, in terms of the entire light ray direction controller 100, the emitted light of the light ray direction control element 200 in the fourteenth perpendicular narrow field mode has an angle distribution in which, as illustrated in FIG. 35, in a plane parallel to the YZ plane, the transmittance gradually decreases toward 0° and 180°, with 90° as the maximum.

As described above, the emitted light of the light ray direction control element 200 in the fourteenth perpendicular narrow field mode has an angle distribution in which, in a plane parallel to the XZ plane and a plane parallel to the YZ plane, the transmittance gradually decreases toward 0° and 180°, with 90° as the maximum. Accordingly, in the fourteenth perpendicular narrow field mode, the light ray direction control element 200 can narrow the viewing angle in the vertical direction and the left-right direction of the display device 300.

Thirteenth Wide Field Mode

When the voltage controller 110 performs control such that the potential V2 of the second light transmitting electrode 22 is greater than the potential V1 of the first light transmitting electrode 12 and the difference between the potential V2 and the potential V1 is greater than in the thirteenth perpendicular narrow field mode (V2>>V1), the electrophoretic particles 54 aggregate on the second light transmitting electrode 22 side of the second light absorbing regions 44, and the first light absorbing regions 34 and the second light absorbing regions 44 hardly function as light absorbing layers. In the following, this state is referred to as the "thirteenth wide field mode."

In the thirteenth wide field mode, the first light absorbing regions 34 and the second light absorbing regions 44 hardly function as light absorbing layers. Accordingly, as illustrated in FIGS. 35 and 36, in a plane parallel to the XZ plane and in a plane parallel to the YZ plane, the emitted light of the light ray direction control element 200 in the thirteenth wide field mode has a uniform angle distribution. When viewed from above, the area of the second light absorbing regions 44 where the electrophoretic particles 54 are aggregated is great and, as such, the transmittance in the thirteenth wide field mode decreases. In the thirteenth wide field mode, the light ray direction control element 200 does not limit the viewing angle of the display device 300.

Fourteenth Wide Field Mode

When the voltage controller 110 performs control such that the potential V1 of the first light transmitting electrode 12 is greater than the potential V2 of the second light transmitting electrode 22 and the difference between the potential V1 and the potential V2 is greater than in the fourteenth perpendicular narrow field mode (V1>>V2), the electrophoretic particles 54 aggregate on the first light transmitting electrode 12 side of the first light absorbing regions 34, and the first light absorbing regions 34 and the second light absorbing regions 44 hardly function as light absorbing layers. In the following, this state is referred to as the "fourteenth wide field mode."

In the fourteenth wide field mode, the first light absorbing regions 34 and the second light absorbing regions 44 hardly function as light absorbing layers. Accordingly, as illustrated in FIGS. 35 and 36, in a plane parallel to the XZ plane and in a plane parallel to the YZ plane, the emitted light of the light ray direction control element 200 in the fourteenth wide field mode has a uniform angle distribution. Additionally, when viewed from above, the area of the first light absorbing regions 34 is smaller than the area of the second light absorbing regions 44 and, as such, the transmittance in the fourteenth wide field mode is higher than the transmittance in the thirteenth wide field mode. In the fourteenth wide field mode, the light ray direction control element 200 does not limit the viewing angle of the display device 300.

Thus, the light ray direction control element 200 of the present embodiment can emit light in three or more types of angle distributions by controlling the potential V1 of the first light transmitting electrode 12 and the potential V2 of the second light transmitting electrode 22.

Embodiment 8

In Embodiments 1 to 7, the first light transmitting regions 32, the first light absorbing regions 34, the second light transmitting regions 42, and the second light absorbing regions 44 are sandwiched between the first light transmitting substrate 10 that includes the first light transmitting electrode 12 and the second light transmitting substrate 20 that includes the second light transmitting electrode 22. However, a configuration is possible in which the light ray direction controller 100 is provided with a third light transmitting substrate 80 between the first light transmitting regions 32 and the first light absorbing regions 34, and the second light transmitting regions 42 and the second light absorbing regions 44. Here, the third light transmitting substrate 80 includes a third light transmitting electrode 82 and a fourth light transmitting electrode 84. Aside from including the third light transmitting substrate 80, the configuration of the light ray direction control element 200 of the present embodiment is the same as the configuration of the light ray direction control element 200 of Embodiment 1.

Figure 38:
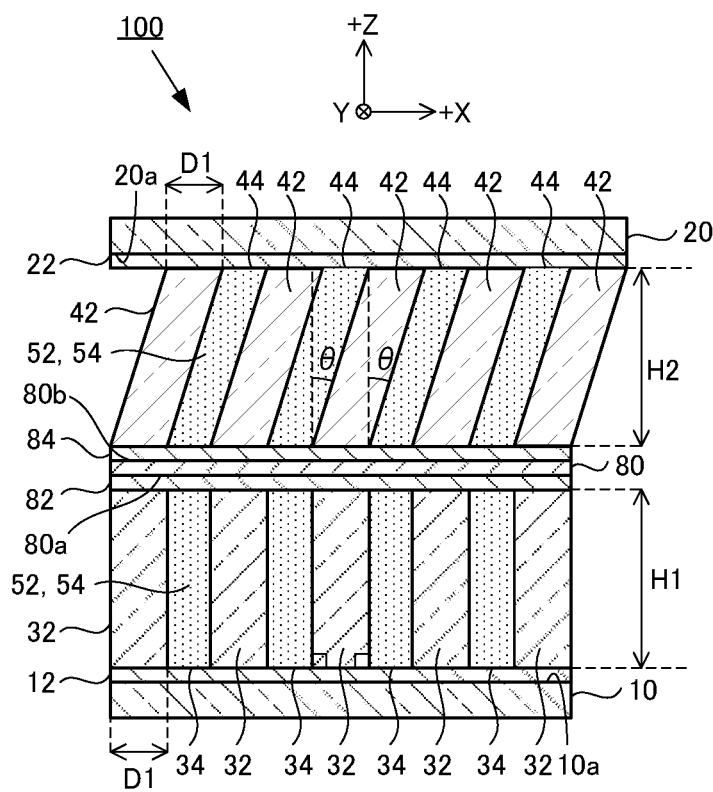
FIG. 38 is a cross-sectional view illustrating a light ray direction controller according to Embodiment 8.

The third light transmitting substrate 80 transmits visible light. In one example, the third light transmitting substrate 80 is implemented as a light transmitting film substrate. As illustrated in FIG. 38, the third light transmitting substrate 80 is disposed between the first light transmitting regions 32 and the first light absorbing regions 34, and the second light transmitting regions 42 and the second light absorbing regions 44. The third light transmitting substrate 80 includes the third light transmitting electrode 82 on a first main surface 80a positioned on the first light transmitting substrate 10 side. Additionally, the third light transmitting substrate 80 includes the fourth light transmitting electrode 84 on a second main surface 80b positioned on the second light transmitting substrate 20 side. Accordingly, the third light transmitting electrode 82 and the fourth light transmitting electrode 84 are disposed between the first light transmitting regions 32 and the first light absorbing regions 34, and the second light transmitting regions 42 and the second light absorbing regions 44. In one example, the third light transmitting electrode 82 and the fourth light transmitting electrode 84 are formed from ITO.

In the present embodiment, the first light transmitting regions 32 and the second light transmitting regions 42, and the first light absorbing regions 34 and the second light absorbing regions 44 are connected via the third light transmitting electrode 82, the third light transmitting substrate 80, and the fourth light transmitting electrode 84. The potentials of the third light transmitting electrode 82 and the fourth light transmitting electrode 84 are controlled by the voltage controller 110.

Next, the operations of the light ray direction control element 200 of the present embodiment are described.

Light-Blocking Mode

When the voltage controller 110 performs control such that the potential V1 of the first light transmitting electrode 12, the potential V2 of the second light transmitting electrode 22, the potential V3 of the third light transmitting electrode 82, and the potential V4 of the fourth light transmitting electrode 84 are equal (V1=V2=V3=V4), the first light absorbing regions 34 and the second light absorbing regions 44 function as light absorbing layers, as in the light-blocking mode of Embodiment 1. Accordingly, the potential V1 of the first light transmitting electrode 12, the potential V2 of the second light transmitting electrode 22, the potential V3 of the third light transmitting electrode 82, and the potential V4 of the fourth light transmitting electrode 84 are equal, the light ray direction control element 200 blocks the light 510 of the surface light source 500, as in the light-blocking mode of Embodiment 1.

Fifth Diagonal Narrow Field Mode

Figure 39:
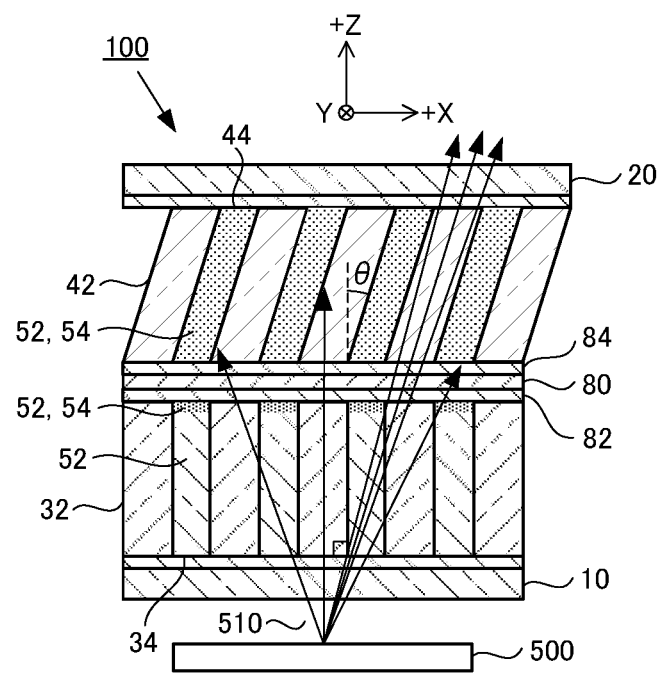
FIG. 39 is a schematic drawing illustrating a fifth diagonal narrow field mode according to Embodiment 8.

When the voltage controller 110 performs control such that the potential V2 of the second light transmitting electrode 22, the potential V3 of the third light transmitting electrode 82, and the potential V4 of the fourth light transmitting electrode 84 are equal and the potential V1 of the first light transmitting electrode 12 is less than the potentials V2 to V4 (V2=V3=V4>V1), the electrophoretic particles 54 of the first light absorbing regions 34 aggregate on the third light transmitting electrode 82 side and the electrophoretic particles 54 of the second light absorbing regions 44 are uniformly dispersed as illustrated in FIG. 39. Accordingly, the first light absorbing regions 34 hardly function as light absorbing layers and the second light absorbing regions 44 function as light absorbing layers. In the following, this state is referred to as the "fifth diagonal narrow field mode."

In the fifth diagonal narrow field mode, the first light absorbing regions 34 hardly function as light absorbing layers and the second light absorbing regions 44 function as light absorbing layers. Accordingly, in a plane parallel to the XZ plane, the emitted light of the light ray direction control element 200 in the fifth diagonal narrow field mode has a narrow angle distribution near 90°−θ, the same as in the first diagonal narrow field mode of Embodiment 1. Additionally, in a plane parallel to a plane inclined to the +X direction side with respect to the YZ plane (0°<angle of inclination<2×θ), the emitted light of the light ray direction control element 200 in the fifth diagonal narrow field mode has a uniform angle distribution.

Fifteenth Perpendicular Narrow Field Mode

Figure 40:
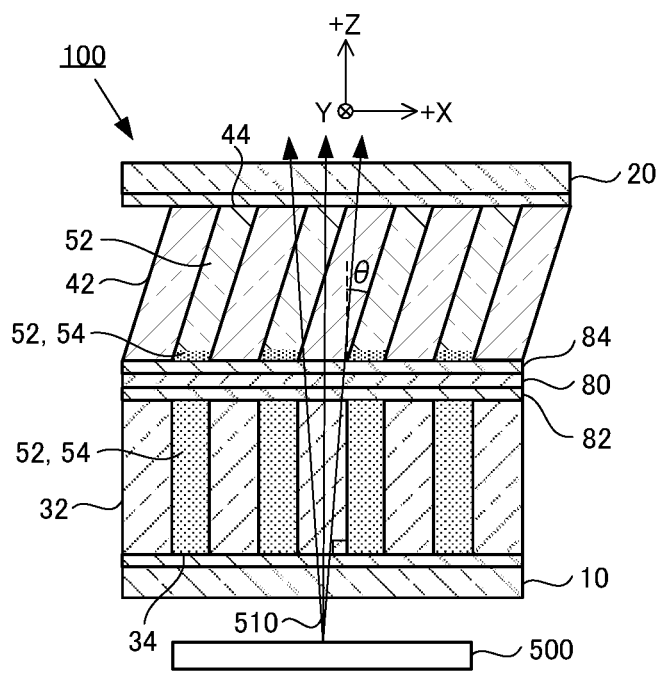
FIG. 40 is a schematic drawing illustrating a fifteenth perpendicular narrow field mode according to Embodiment 8.

When the voltage controller 110 performs control such that the potential V1 of the first light transmitting electrode 12, the potential V3 of the third light transmitting electrode 82, and the potential V4 of the fourth light transmitting electrode 84 are equal and the potential V2 of the second light transmitting electrode 22 is less than the potentials V1, V3, and V4 (V1=V3=V4>V2), the electrophoretic particles 54 of the second light absorbing regions 44 aggregate on the fourth light transmitting electrode 84 side and the electrophoretic particles 54 of the first light absorbing regions 34 are uniformly dispersed as illustrated in FIG. 40. Accordingly, the second light absorbing regions 44 hardly function as light absorbing layers and the first light absorbing regions 34 function as light absorbing layers. In the following, this state is referred to as the "fifteenth perpendicular narrow field mode."

In the fifteenth perpendicular narrow field mode, the second light absorbing regions 44 hardly function as light absorbing layers and the first light absorbing regions 34 function as light absorbing layers. Accordingly, in a plane parallel to the XZ plane, the emitted light of the light ray direction control element 200 in the fifteenth perpendicular narrow field mode has a narrow angle distribution near 90° (the +Z direction), the same as in the first perpendicular narrow field mode of Embodiment 1. Additionally, in a plane parallel to the YZ plane, the emitted light of the light ray direction control element 200 in the fifteenth perpendicular narrow field mode has a uniform angle distribution.

Fifteenth Wide Field Mode

Figure 41:
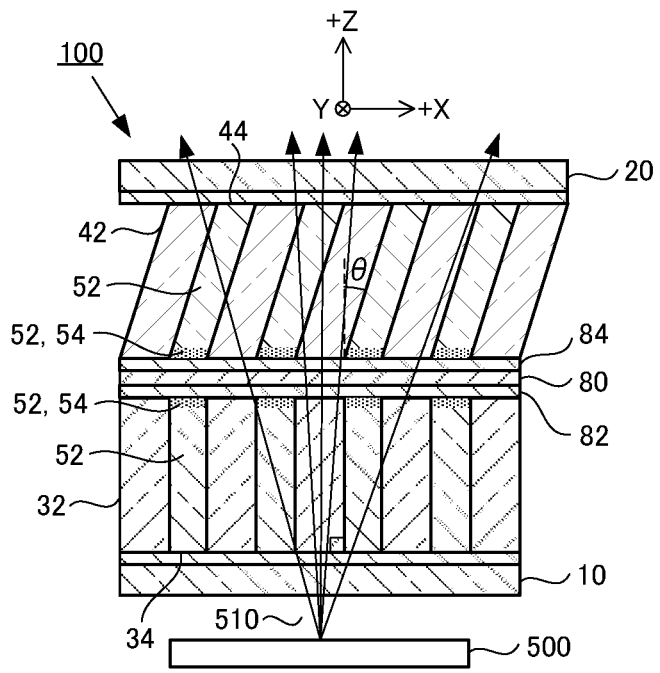
FIG. 41 is a schematic drawing illustrating a fifteenth wide field mode according to Embodiment 8.

When the voltage controller 110 performs control such that the potential V1 of the first light transmitting electrode 12 and the potential V2 of the second light transmitting electrode 22 are equal, and the potential V3 of the third light transmitting electrode 82 and the potential V4 of the fourth light transmitting electrode 84 are equal and greater than the potentials V1 and V2 (V1=V2<V3=V4), the electrophoretic particles 54 of the first light absorbing regions 34 aggregate on the third light transmitting electrode 82 side and the electrophoretic particles 54 of the second light absorbing regions 44 aggregate on the fourth light transmitting electrode 84 side, as illustrated in FIG. 41. Accordingly, the first light absorbing regions 34 and the second light absorbing regions 44 hardly function as light absorbing layers. In the following, this state is referred to as the "fifteenth wide field mode."

In the fifteenth wide field mode, the first light absorbing regions 34 and the second light absorbing regions 44 hardly function as light absorbing layers. Accordingly, in a plane parallel to the XZ plane and in a plane parallel to the YZ plane, the emitted light of the light ray direction control element 200 in the fifteenth wide field mode has a uniform angle distribution, the same as in the first wide field mode and the second wide field mode of Embodiment 1.

Thus, as with the light ray direction control element 200 of Embodiment 1, the light ray direction control element 200 of the present embodiment can emit light in three or more types of angle distributions.

Modified Examples

Embodiments have been described, but various modifications can be made to the present disclosure without departing from the spirit and scope of the present disclosure.

For example, a configuration is possible in which the first light transmitting substrate 10 and the second light transmitting substrate 20 are formed from a light transmitting resin. A configuration is possible in which the third light transmitting substrate 80 is implemented as a glass substrate. A configuration is possible in which the electrophoretic particles 54 are positively charged.

Additionally, a configuration is possible in which the first light transmitting regions 32 and the second light transmitting regions 42 are integrally formed. For example, the first light transmitting regions 32 and the second light transmitting regions 42 of Embodiment 1 may be formed as one light transmitting layer that is bent partway through.

The first light transmitting regions 32 of Embodiment 3 are perpendicular to the first main surface 10a of the first light transmitting substrate 10. However, a configuration is possible in which the first light transmitting regions 32 of Embodiment 3 are inclined in the reverse direction of the second light transmitting regions 42 with respect to the +Z direction, as with the first light transmitting regions 32 of Embodiment 2.

Figure 42:
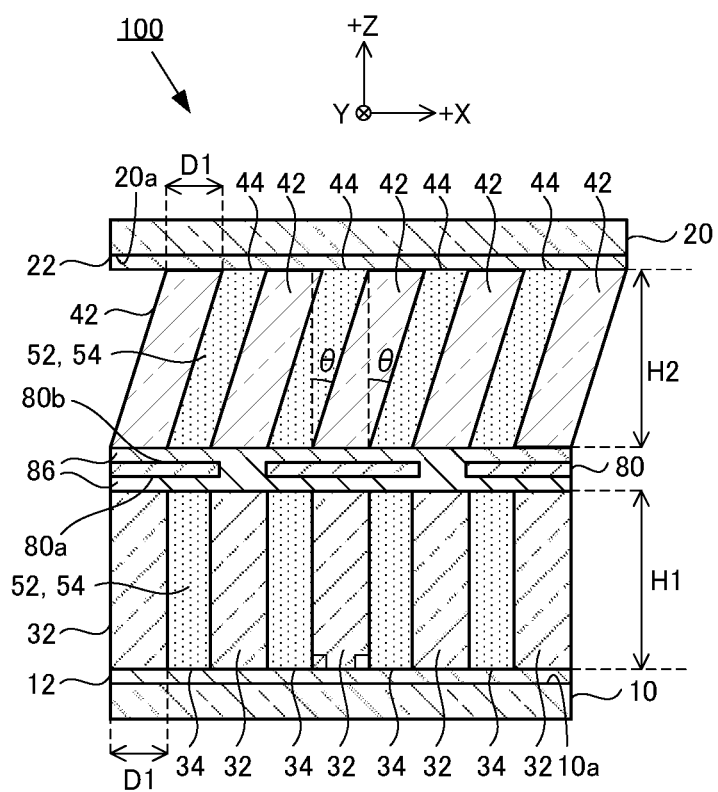
FIG. 42 is a cross-sectional view illustrating a light ray direction controller according to a modified example.

In Embodiment 8, the third light transmitting electrode 82 and the fourth light transmitting electrode 84 are provided on the third light transmitting substrate 80, and the third light transmitting electrode 82 and the fourth light transmitting electrode 84 are disposed between the first light transmitting regions 32 and the first light absorbing regions 34, and the second light transmitting regions 42 and the second light absorbing regions 44. As illustrated in FIG. 42, a configuration is possible in which a fifth light transmitting electrode 86 is disposed between the first light transmitting regions 32 and the first light absorbing regions 34, and the second light transmitting regions 42 and the second light absorbing regions 44. The fifth light transmitting electrode 86 is provided on the first main surface 80a and the second main surface 80b of the third light transmitting substrate 80, via a through-hole. In this case, the angle distribution of the light that transmits through the light ray direction controller 100 can be controlled by controlling the potential V1 of the first light transmitting electrode 12, the potential V2 of the second light transmitting electrode 22, and a potential V5 of the fifth light transmitting electrode 86.

For example, by making the potential V1 of the first light transmitting electrode 12, the potential V2 of the second light transmitting electrode 22, and the potential V5 of the fifth light transmitting electrode 86 equal, the light ray direction control element 200 can block the light 510 from the surface light source 500 (V1=V2=V5), as in the light-blocking mode of Embodiment 8. Additionally, by making the potential V1 of the first light transmitting electrode 12 and the potential V5 of the fifth light transmitting electrode 86 equal and making the potential V2 of the second light transmitting electrode 22 less than the potentials V1 and V5, the same angle distribution as in the fifth diagonal narrow field mode of Embodiment 8 can be obtained (V1=V5>V2). Furthermore, by making the potential V2 of the second light transmitting electrode 22 and the potential V5 of the fifth light transmitting electrode 86 equal and making the potential V1 of the first light transmitting electrode 12 less than the potentials V2 and V5, the same angle distribution as in the fifteenth perpendicular narrow field mode of Embodiment 8 can be obtained (V1<V2=V5). By making the potential V1 of the first light transmitting electrode 12 and the potential V2 of the second light transmitting electrode 22 equal and making the potential V1 and V2 less than the potential V5 of the fifth light transmitting electrode 86, the angle distribution of the fifteenth wide field mode of Embodiment 8 can be obtained (V1=V2<V5).

The voltage controller 110 is not limited to a control circuit. The voltage controller 110 may be configured from an application specific integrated circuit (ASIC), a field-programmable gate array (FPGA), a central processing unit (CPU) and a read-only memory (ROM), or the like.

Figure 43:
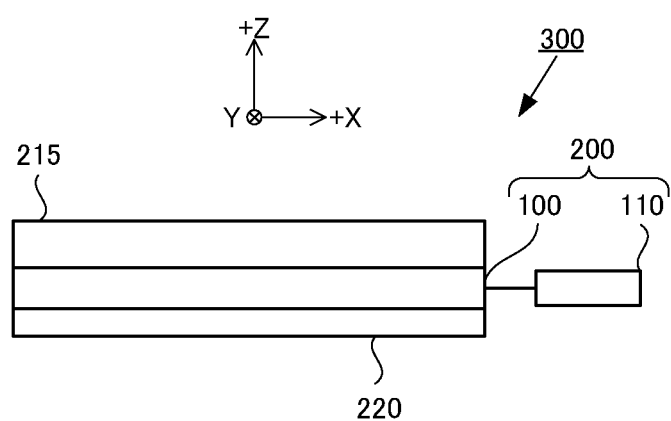
FIG. 43 is a schematic drawing illustrating a display device according to a modified example.

As illustrated in FIG. 43, a configuration is possible in which the display device 300 includes the light ray direction control element 200, a transmissive liquid crystal display panel 215, and a back light 220. The back light 220 is disposed on the side of the transmissive liquid crystal display panel 215 opposite the display surface, and supplies light to the transmissive liquid crystal display panel 215. The light ray direction controller 100 of the light ray direction control element 200 is disposed between the transmissive liquid crystal display panel 215 and the back light 220, and controls the angle distribution of the light supplied from the back light 220 to the transmissive liquid crystal display panel 215.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A light ray direction control element comprising:
   a first light transmitting substrate;
   a second light transmitting substrate facing the first light transmitting substrate;
   a plurality of first light transmitting regions that is provided on a first main surface of the first light transmitting substrate and that extends from the first light transmitting substrate toward the second light transmitting substrate;
   a plurality of second light transmitting regions that is provided on a first main surface of the second light transmitting substrate that faces the first main surface of the first light transmitting substrate, that extends from the second light transmitting substrate toward the first light transmitting substrate, and that is continuous with the first light transmitting regions;
   a plurality of first light absorbing regions that extends from the first light transmitting substrate toward the second light transmitting substrate, each of the plurality of first light absorbing regions being positioned between two adjacent first light transmitting regions of the plurality of first light transmitting regions;
   a plurality of second light absorbing regions that extends from the second light transmitting substrate toward the first light transmitting substrate, and that is continuous with the plurality of first light absorbing regions, each of the plurality of second light absorbing regions being positioned between two adjacent second light transmitting regions of the plurality of second light transmitting regions;
   a light transmitting dispersion medium that is enclosed in the plurality of first light absorbing regions and the plurality of second light absorbing regions; and
   charged electrophoretic particles that are dispersed in the light transmitting dispersion medium and that have a dispersion state that changes according to voltage that is applied, wherein
   when viewing a cross-section perpendicular to the first main surface of the first light transmitting substrate and the first main surface of the second light transmitting substrate, a shape or an angle of inclination, with respect to the first main surface of the first light transmitting substrate, of the plurality of first light transmitting regions and the plurality of second light transmitting regions differs.

2. The light ray direction control element according to claim 1, wherein
   when viewed from above, the plurality of first light transmitting regions and the plurality of second light transmitting regions are arranged in a same direction, and
   when viewing a cross-section perpendicular to the first main surface of the first light transmitting substrate and the first main surface of the second light transmitting substrate, the plurality of first light transmitting regions extends perpendicular to the first main surface of the first light transmitting substrate, and the plurality of second light transmitting regions is inclined with respect to a direction perpendicular to the first main surface of the first light transmitting substrate.

3. The light ray direction control element according to claim 1, wherein
   when viewed from above, the plurality of first light transmitting regions and the plurality of second light transmitting regions are arranged in a same direction, and
   when viewing a cross-section perpendicular to the first main surface of the first light transmitting substrate and the first main surface of the second light transmitting substrate, the plurality of first light transmitting regions and the plurality of second light transmitting regions are inclined in opposite directions with respect to a direction perpendicular to the first main surface of the first light transmitting substrate.

4. The light ray direction control element according to claim 1, wherein
   when viewed from above, the plurality of first light transmitting regions and the plurality of second light transmitting regions are arranged in a matrix, and when viewing a cross-section perpendicular to the first main surface of the first light transmitting substrate and the first main surface of the second light transmitting substrate, the plurality of first light transmitting regions extends perpendicular to the first main surface of the first light transmitting substrate, and the plurality of second light transmitting regions is inclined with respect to a direction perpendicular to the first main surface of the first light transmitting substrate.

5. The light ray direction control element according to claim 1, wherein
when viewed from above, the plurality of first light transmitting regions and the plurality of second light transmitting regions are arranged in a matrix, and
when viewing a cross-section perpendicular to the first main surface of the first light transmitting substrate and the first main surface of the second light transmitting substrate, the plurality of first light transmitting regions and the plurality of second light transmitting regions are inclined in opposite directions with respect to a direction perpendicular to the first main surface of the first light transmitting substrate.

6. The light ray direction control element according to claim 1, wherein when viewing a cross-section perpendicular to the first main surface of the first light transmitting substrate and the first main surface of the second light transmitting substrate, the plurality of first light transmitting regions and the plurality of second light transmitting regions have different widths in a direction parallel to the first main surface of the first light transmitting substrate.

7. The light ray direction control element according to claim 6, wherein when viewed from above, the plurality of first light transmitting regions and the plurality of second light transmitting regions extend in a same direction.

8. The light ray direction control element according to claim 6, wherein when viewed from above, the plurality of first light transmitting regions extends in a predetermined first direction, and the plurality of second light transmitting regions is arranged on the plurality of first light transmitting regions.

9. The light ray direction control element according to claim 1, wherein when viewed from above, the plurality of first light transmitting regions and the plurality of second light transmitting regions extend in mutually different directions.

10. The light ray direction control element according to claim 1, wherein when viewed from above, the plurality of first light transmitting regions has a lattice shape, and the plurality of second light transmitting regions is arranged in a predetermined second direction.

11. The light ray direction control element according to claim 1, wherein
a first light transmitting electrode is provided on the first main surface of the first light transmitting substrate, and a second light transmitting electrode is provided on the first main surface of the second light transmitting substrate, and
a dispersion state of the electrophoretic particles is changed according to voltage that is applied by the first light transmitting electrode and the second light transmitting electrode.

12. The light ray direction control element according to claim 1, wherein
a first light transmitting electrode is provided on the first main surface of the first light transmitting substrate, and a second light transmitting electrode is provided on the second light transmitting substrate,
the light ray direction control element further comprises a third light transmitting electrode and a fourth light transmitting electrode between the plurality of first light transmitting regions and the plurality of first light absorbing regions, and the plurality of second light transmitting regions and the plurality of second light absorbing regions, and
a dispersion state of the electrophoretic particles is changed according to voltage that is applied by the first light transmitting electrode and the third light transmitting electrode, and voltage that is applied by the second light transmitting electrode and the fourth light transmitting electrode.

13. The light ray direction control element according to claim 1, wherein
a first light transmitting electrode is provided on the first main surface of the first light transmitting substrate, and a second light transmitting electrode is provided on the second light transmitting substrate,
the light ray direction control element further comprises a fifth light transmitting electrode between the plurality of first light transmitting regions and the plurality of first light absorbing regions, and the plurality of second light transmitting regions and the plurality of second light absorbing regions, and
a dispersion state of the electrophoretic particles is changed according to voltage that is applied by the first light transmitting electrode and the fifth light transmitting electrode, and voltage that is applied by the second light transmitting electrode and the fifth light transmitting electrode.

14. The light ray direction control element according to claim 1, further comprising:
a voltage controller that controls voltage applied to the electrophoretic particles, wherein
when causing the dispersion state of the electrophoretic particles to transition from a dispersion state in which the electrophoretic particles are dispersed in the plurality of first light absorbing regions and the plurality of second light absorbing regions to a dispersion state that is formed by voltage of a first voltage value being applied to the electrophoretic particles and in which the electrophoretic particles are dispersed in one of the plurality of first light absorbing regions and the plurality of second light absorbing regions and are not dispersed in another of the plurality of first light absorbing regions and the plurality of second light absorbing regions, the voltage controller applies voltage of a second voltage value greater than the first voltage value to the electrophoretic particles to transition the dispersion state of the electrophoretic particles, via a dispersion state in which the electrophoretic particles are aggregated in one of the plurality of first light absorbing regions and the plurality of second light absorbing regions.

15. A display device comprising:
the light ray direction control element according to claim 1; and
a display panel, wherein
the light ray direction control element is disposed on a display surface of the display panel.

16. A display device comprising:
the light ray direction control element according to claim 1;
a transmissive liquid crystal display panel; and
a back light that is disposed on a side of the transmissive liquid crystal display panel opposite a display surface, and that supplies light to the transmissive liquid crystal display panel, wherein
the light ray direction control element is disposed between the transmissive liquid crystal display panel and the back light.

17. The light ray direction control element according to claim 1, wherein the plurality of second light transmitting regions are continuous with the plurality of first light transmitting regions by being in contact with the plurality of first light transmitting regions and the plurality of second light absorbing regions is continuous with the plurality of first light absorbing regions by being in contact with the plurality of first light absorbing regions.

* * * * *